United States Patent
Lacey et al.

(10) Patent No.: US 12,347,256 B2
(45) Date of Patent: Jul. 1, 2025

(54) ATTACK RESISTANT, ENERGY HARVESTING, AND ADAPTABLE INTERACTIVE PANEL

(71) Applicant: AADG, INC., New Haven, CT (US)

(72) Inventors: Carolyn Lacey, Valparaiso, IN (US); Daniel Brian Glover, Franklin, TN (US)

(73) Assignee: AADG, INC., New Haven, CT (US)

(*) Notice: Subject to any disclaimer, the term of this patent is extended or adjusted under 35 U.S.C. 154(b) by 92 days.

(21) Appl. No.: 17/982,624

(22) Filed: Nov. 8, 2022

(65) Prior Publication Data
US 2023/0146255 A1 May 11, 2023

Related U.S. Application Data

(60) Provisional application No. 63/277,368, filed on Nov. 9, 2021, provisional application No. 63/277,378, filed on Nov. 9, 2021.

(51) Int. Cl.
*G07C 9/22* (2020.01)
*E05F 15/76* (2015.01)
(Continued)

(52) U.S. Cl.
CPC ............... *G07C 9/22* (2020.01); *E05F 15/76* (2015.01); *G06F 16/9035* (2019.01); *G07C 9/10* (2020.01); *E05Y 2400/818* (2013.01)

(58) Field of Classification Search
None
See application file for complete search history.

(56) References Cited

U.S. PATENT DOCUMENTS 3,860,994 A * 1/1975 Itoda .................... E05F 5/02
16/289
4,414,703 A * 11/1983 Schnarr ............... E05F 3/102
16/56
(Continued)

FOREIGN PATENT DOCUMENTS

CA 3052640 A1 * 8/2018 ............. E05B 41/00
CA 3059871 A1 * 10/2018 ............. E05F 15/668
(Continued)

*Primary Examiner* — Fekadeselassie Girma
(74) *Attorney, Agent, or Firm* — Moore & Van Allen PLLC; Jeffrey R. Gray

(57) ABSTRACT

Interactive panels are used to display information to one or more users that are interacting with the interactive panels. One or more detection devices (e.g., sensors, communication devices, or the like) detect that users may be located near the interactive panels. The information displayed to the users may be any type of information, such as user information, product information, entity information, area information, or other like information. The interactive panels may be used in any type of barrier, such as doors, walls, fee-standing structures within or outside of a building, adaptable panels that are moveable, or the like. The interactive panels may have energy harvesting layers that at least partially aid in powering the interactive panels and/or components thereof. The interactive panels may have protection layers that at least partially aid in protecting the displays and/or energy harvesting layers of the interactive panels from damage.

20 Claims, 21 Drawing Sheets

(51) Int. Cl.
  *G06F 16/9035* (2019.01)
  *G07C 9/10* (2020.01)

(56) References Cited

U.S. PATENT DOCUMENTS

| | | | | |
|---|---|---|---|---|
| 4,689,853 A * | 9/1987 | Marinoni | E05D 5/0246 | |
| | | | 16/382 | |
| 5,265,311 A * | 11/1993 | Gard | E05F 1/06 | |
| | | | 16/311 | |
| 5,546,706 A * | 8/1996 | Coupet | E05D 15/0669 | |
| | | | 49/404 | |
| 6,084,367 A * | 7/2000 | Landert | E05F 15/608 | |
| | | | 318/283 | |
| 7,174,944 B1 * | 2/2007 | Clark | E05D 15/08 | |
| | | | 49/424 | |
| 10,678,490 B1 * | 6/2020 | Brown | G06F 3/1446 | |
| 11,170,593 B1 * | 11/2021 | Schneider | H04N 7/186 | |
| 11,210,877 B1 * | 12/2021 | Amadi | G07C 9/00309 | |
| 11,420,558 B2 * | 8/2022 | Seegers | B60Q 9/00 | |
| 11,619,512 B1 * | 4/2023 | Gupta | G06F 3/14 | |
| | | | 345/589 | |
| 2003/0162591 A1 * | 8/2003 | Nguyen | G07F 17/3206 | |
| | | | 463/29 | |
| 2004/0049984 A1 * | 3/2004 | Pfaff | E05F 17/00 | |
| | | | 49/73.1 | |
| 2005/0020354 A1 * | 1/2005 | Nguyen | G07F 17/3248 | |
| | | | 463/25 | |
| 2005/0150169 A1 * | 7/2005 | Schulte | E05D 15/0626 | |
| | | | 49/410 | |
| 2005/0241781 A1 * | 11/2005 | Johnson | E05F 15/51 | |
| | | | 160/199 | |
| 2009/0045646 A1 * | 2/2009 | Clare | E05D 3/16 | |
| | | | 296/183.1 | |
| 2013/0220558 A1 * | 8/2013 | Knight | E05F 15/76 | |
| | | | 160/206 | |
| 2016/0340956 A1 * | 11/2016 | Ibsies | E05F 15/614 | |
| 2017/0138111 A1 * | 5/2017 | Lietz | E06B 9/68 | |
| 2017/0218678 A1 * | 8/2017 | Kothari | E05F 15/76 | |
| 2017/0320685 A1 * | 11/2017 | Hoofard | E05F 15/40 | |
| 2017/0337871 A1 * | 11/2017 | Kurokawa | G09G 3/2096 | |
| 2018/0175780 A1 * | 6/2018 | Hall | E06B 3/481 | |
| 2019/0073842 A1 * | 3/2019 | Lee | H04L 63/0853 | |
| 2020/0086721 A1 * | 3/2020 | Kobel | G06V 20/52 | |
| 2020/0165859 A1 * | 5/2020 | Hong | G09G 3/344 | |
| 2020/0217057 A1 * | 7/2020 | Spiro | G08B 21/22 | |
| 2020/0363070 A1 * | 11/2020 | Combs, Jr. | F24C 15/023 | |
| 2021/0207431 A1 * | 7/2021 | Kim | A47G 29/141 | |
| 2021/0209878 A1 * | 7/2021 | Kim | G07C 9/37 | |
| 2021/0317697 A1 * | 10/2021 | Tulsidas | G06V 40/40 | |
| 2021/0344937 A1 * | 11/2021 | Liu | H04N 19/20 | |
| 2021/0363811 A1 * | 11/2021 | Subramanian | E05F 15/73 | |
| 2021/0404237 A1 * | 12/2021 | Eccleston | E05F 15/627 | |
| 2022/0051515 A1 * | 2/2022 | Schmidt | G07C 9/00944 | |
| 2022/0068078 A1 * | 3/2022 | Schmidt | G06Q 10/063 | |
| 2022/0154521 A1 * | 5/2022 | Schneider | E06B 3/5072 | |
| 2022/0331054 A1 * | 10/2022 | Kimball | G06T 11/00 | |
| 2022/0356743 A1 * | 11/2022 | Beggs | E06B 9/581 | |
| 2023/0146255 A1 * | 5/2023 | Lacey | G07C 9/30 | |
| | | | 340/5.81 | |
| 2023/0159286 A1 * | 5/2023 | Schler | B65G 67/24 | |
| | | | 414/389 | |
| 2024/0110432 A1 * | 4/2024 | Pipkins | E05F 15/73 | |

FOREIGN PATENT DOCUMENTS

| | | | |
|---|---|---|---|
| CN | 110273631 A | * | 9/2019 |
| CN | 113279630 A | * | 8/2021 |
| CN | 113294078 A | * | 8/2021 |
| CN | 214175518 U | * | 9/2021 |

* cited by examiner

ATTACK RESISTANT, ENERGY HARVESTING, AND ADAPTABLE INTERACTIVE PANEL

CROSS REFERENCE AND PRIORITY CLAIM UNDER 35 U.S.C. § 119

This application claims priority to U.S. Provisional Application No. 63/277,368 entitled "Attack Resistant and Energy Harvesting Interactive Panel" filed on Nov. 9, 2021, and U.S. Provisional Application No. 63/277,378 entitled "Adaptable Interactive Panel" filed on Nov. 9, 2021, all of the foregoing assigned to the assignee hereof and the entirety of which is incorporated by reference herein.

FIELD

The present disclosure relates generally to interactive panels (e.g., having traditional or transparent screens) for a structure, and more particularly, to interactive panels that are attack resistant, energy harvesting, and/or adaptable.

BACKGROUND

Interactive screens may be included in doors, walls, or free standing structures but incorporating such screens results in issues with respect to designing, operating, and maintaining such interactive screens.

BRIEF SUMMARY

Interactive panels are used to display information to one or more users that are interacting with the interactive panels. For example, one or more detection devices (e.g., sensors, communication devices, or the like, including but not limited to devices used in Building Management systems, RFID Credentials, Biometric sensors, Wi-Fi communication devices, Bluetooth (e.g., original, or low energy BLE)) detect that users (e.g., general users, specific users, or the like) may be located near the interactive panels (e.g., approaching the interactive panel, passing the interactive panel, located within a room, and/or the like). The information displayed to the user may be any type of information, such as user information (e.g., user profiles, healthcare data, or the like), product information (e.g., information about goods or services, designs, product marking material, or the like), entity information (e.g., information about entities that provide products), area information (e.g., directions, areas of interest, weather conditions, or the like). The interactive panels may be used in any type of barrier, such as doors, walls, fee-standing structures within or outside of a building, or the like. The interactive panels may have energy harvesting layers that at least partially aid in powering the interactive panels and/or components thereof. Furthermore, the interactive panels may have protection layers that at least partially aid in protecting the displays and/or energy harvesting layers of the interactive panels from damage.

In some embodiments, the interactive panel may be an adaptable interactive panel for use within a barrier, removed from a barrier and used as a free standing interactive panel, or may be coupled to a mobile support such that the interactive adaptable panel can be moved or move autonomously around an area. As such, the adaptable panel may be incorporated into a barrier, such as a wall (e.g., between adjacent enclosed or partially open areas, such as rooms) or door (e.g., sliding door, swinging hinged door, or the like), and be adjustable between one or more sides of the barrier.

In some embodiments the barrier may be a fixed structure in an enclosed room or at least partially open area, such as an advertising structure, or the like. Alternatively, or additionally, the interactive adaptable panels may be removable from the barrier and installed in an autonomous structure that is able to move around an area.

One embodiment of the invention is an interactive panel comprising one or more panel displays and an interactive panel system operatively coupled to the one or more panel displays. The interactive panel system comprises one or more memory devices with computer-readable program code stored thereon, and one or more processing devices operatively coupled to the one or more memory devices. The computer-readable code is configured to cause the one or more processing devices to identify a presence of one or more users or a condition change adjacent the one or more panel displays through the use of one or more detection devices. The computer-readable code is further configured to cause the one or more processing devices to provide information on the one or more panel displays to the one or more users in response to identifying the presence of the one or more users or the condition change.

In further accord with embodiments, the one or more detection devices comprise one or more sensors operatively coupled to the interactive panel system.

In other embodiments, the one or more detection devices comprise one or more communication devices that communicates with one or more user devices of the one or more users.

In yet other embodiments, the one or more detection devices capture a user identifier from one or more user devices and accesses the information from stored information for the one or more users using the user identifier.

In still other embodiments, the interactive panel further comprises a protective layer operatively coupled over at least a portion of the one or more panel displays.

In other embodiments, the protective layer is removeable and replaceable.

In further accord with embodiments, the interactive panel further comprises an energy harvesting layer operatively coupled to the interactive panel system to provide power to the one or more panel displays or the interactive panel system directly or indirectly through one or more batteries.

In other embodiments, the energy harvesting layer is operatively coupled over at least a portion of the one or more panel displays.

In yet other embodiments, the one or more panel displays comprise an outer panel display and an inner panel display. The outer panel display provides the information to outside users and the inner panel display provides the information to inside users.

In still other embodiments, the one or more detection devices comprise one or more outer detection devices and one or more inner detection devices. The one or more outer detection devices are used to identify the presence of one or more outer users or an outer condition change adjacent the outer panel display. The one or more inner detection devices are used to identify the presence of one or more inner users or an inner condition change adjacent the inner panel display. The information may be provided on the outer panel display or the inner panel display.

In other embodiments, the information comprises user information, product information, entity information, or area information.

In further accord with embodiments, the information is user information that comprises a user profile, a username, a user title, a user image, or a user bio.

In other embodiments, the information is product information that comprises information about a good or a service or product marking material.

In yet other embodiments, the information is entity information that comprises information about entities that provide products or entity locations.

In still other embodiments, the information is area information that comprises information about directions, weather conditions, or occupancy information.

In other embodiments, the interactive panel is configured for use within a barrier, and wherein the barrier comprises a door or a wall.

In further accord with embodiments, the one or more panel displays comprises at least a first display in the door of the barrier and at least a second display in the wall of the barrier.

In other embodiments, the interactive panel is operatively coupled to a mobile transport system, is removeable form a barrier, or is adaptable within the barrier.

Another embodiment of the invention comprises an interactive barrier comprising a barrier and one or more interactive panels. The one or more interactive panels comprise one or more panel displays, an interactive panel system operatively coupled to the one or more panel displays. The panel system comprises one or more memory devices with computer-readable program code stored thereon and one or more processing devices operatively coupled to the one or more memory devices. The computer-readable code is configured to cause the one or more processing devices to identify a presence of one or more users or a condition change adjacent the one or more panel displays through the use of one or more detection devices. The computer-readable code is further configured to provide information on the one or more panel displays to the one or more users in response to identifying the presence of the one or more users or the condition change.

Another embodiment of the invention comprises a method for utilizing an interactive panel in a barrier. The interactive panel comprises one or more panel displays and an interactive panel system operatively coupled to the one or more panel displays. The panel system comprises one or more memory devices with computer-readable program code stored thereon and one or more processing devices operatively coupled to the one or more memory devices. The method comprises identifying, by the processor(s), a presence of one or more users or a condition change adjacent the one or more panel displays through the use of one or more detection devices. The method further comprises providing, by the processor(s), information on the one or more panel displays to the one or more users in response to identifying the presence of the one or more users or the condition change.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The following figures (sometimes abbreviated as "Fig." or "Figs." herein) will now be described by way of example, not by way of limitation, in which.

Figure 1:
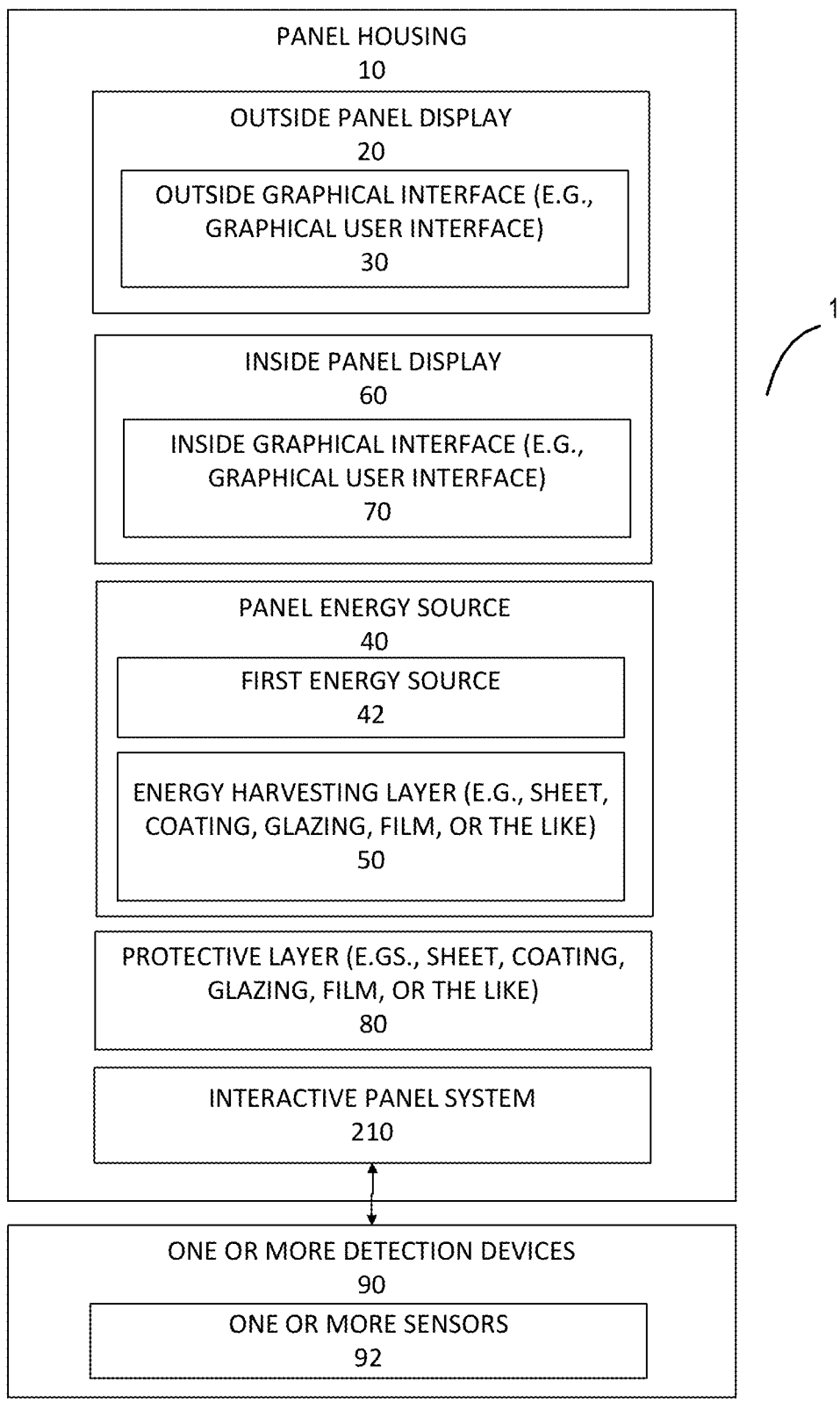
FIG. 1 illustrates an interactive panel block diagram, in accordance with some embodiments of the present disclosure.
Figure 2A:
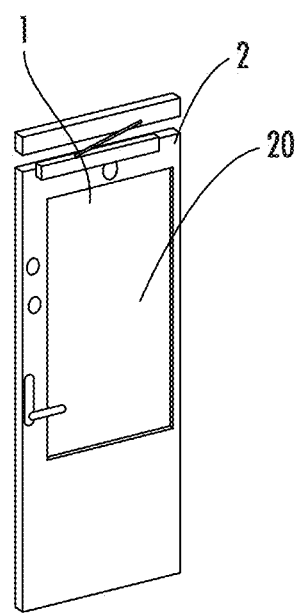
FIG. 2A illustrates a perspective view of an interactive panel in a barrier, such as on the outside face of a door, in accordance with some embodiments of the present disclosure.
Figure 2B:
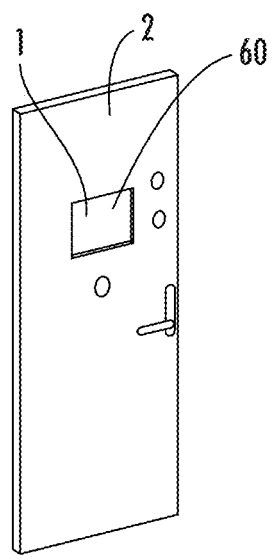
FIG. 2B illustrates a perspective view of an interactive panel in a barrier, such as on the inside face of a door, in accordance with some embodiments of the present disclosure.
Figure 2C:
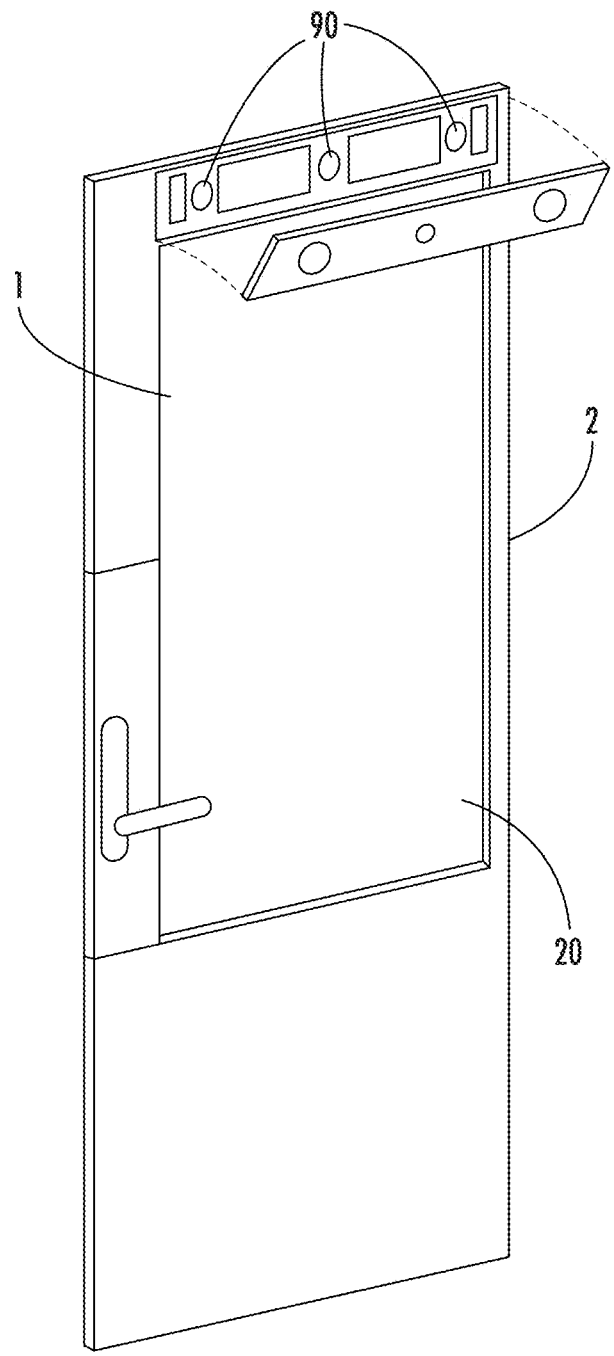
FIG. 2C illustrates a partially exploded perspective view of an interactive panel in a barrier, such as on the outside face of a door, in accordance with some embodiments of the present disclosure.
Figure 2D:
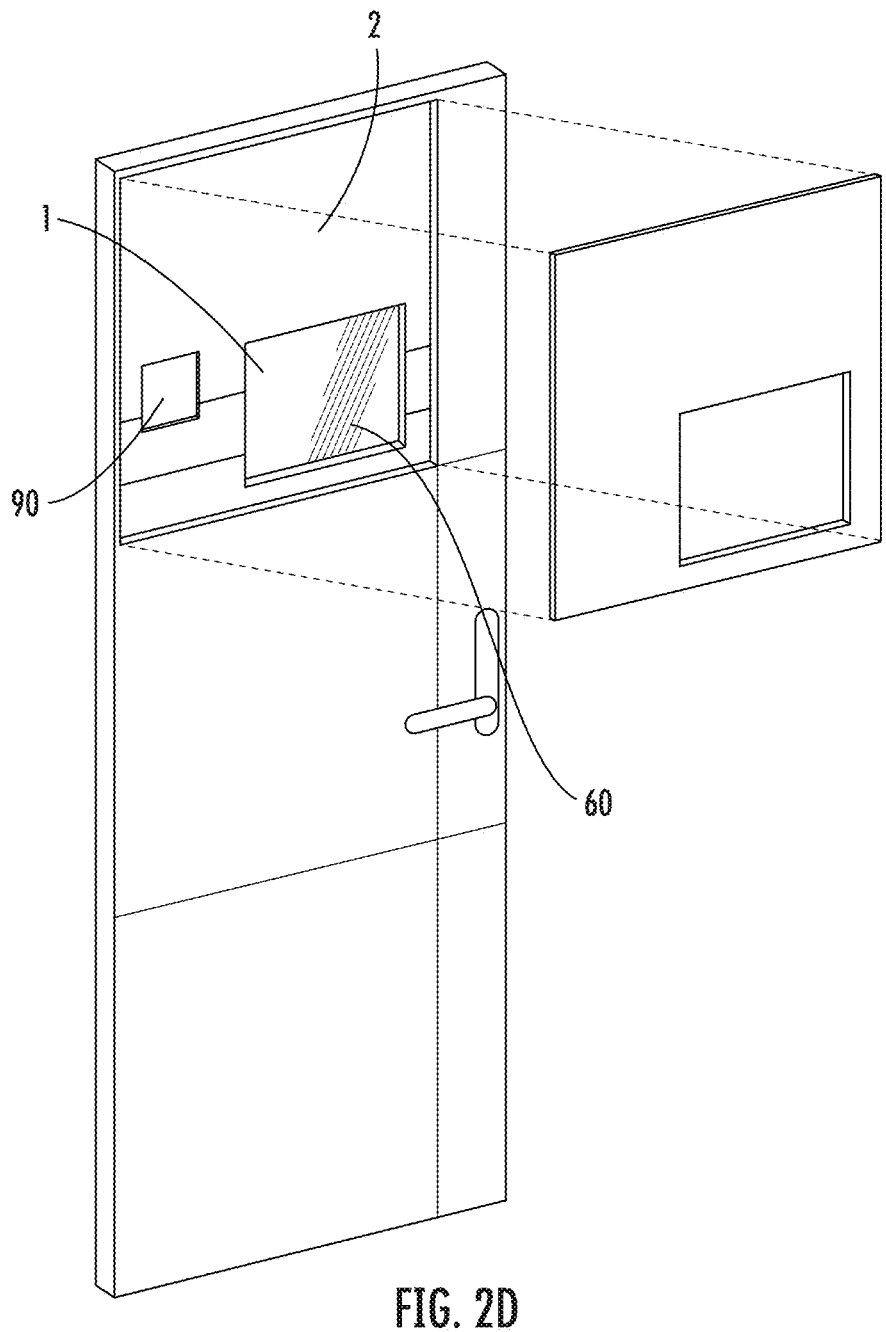
FIG. 2D illustrates a partially exploded perspective view of an interactive panel in a barrier, such as on the inside face of a door, in accordance with some embodiments of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible to embodiments in many different forms, there is shown in the drawings and will herein be described in detail embodiments of the present disclosure with the understanding that the present disclosure is to be considered as an exemplification of the principles of the present disclosure and is not intended to limit the broad aspect of the present disclosure to the embodiments illustrated.

FIGS. 1 through 12 illustrate embodiments of the present disclosure in which an interactive panel 1 is used to display information to one or more users 204 that are interacting with the interactive panel 1. The interactive panel 1 and/or the barrier 2, in which the interactive panel 1 is located, may include energy harvesting features (e.g., solar energy capture, kinetic energy capture, or the like). Moreover, in some embodiments the interactive panel 1 and/or the barrier 2 (e.g., door 6, wall 8, free-standing structure, or the like), in which the interactive panel 1 is located, may have security features, such as protection layers (e.g., attack resistance, weather resistance, or the like), EMC shielding, sound abatement, or the like.

FIG. 1 illustrates a schematic of an interactive panel 1, which may be incorporated into any type of barrier 2. The barrier 2 may be a wall 4 (e.g., between adjacent enclosed or partially open areas, such as two rooms, a room and a hallway, a room and the outside of a building, or the like). Alternatively, or additionally, the barrier 2 may be a door 6 (e.g., sliding door, swinging hinged door, dual doors, or the like), or any which may be located between adjacent enclosed or partially open areas, as described above. In some embodiments, the barrier 2 may be a fixed structure in an enclosed room or in an at least partially open area, such as an advertising structure, transportation structure, shelter, and/or the like. As such, the barrier 2 may be any type of partition. As generally illustrated in FIG. 1, the interactive panel 1 may comprise one or more displays having graphical user interfaces. In other embodiments, as will be described in further detail herein, the interactive panel 1 may be an adaptable interactive panel 1 that may be moveable and/or removable from the barrier 2.

The interactive panel 1 may have a housing 10 (e.g., frames, faces, covers, or the like) that at least partially enclose some of the components of the interactive panel 1. The housing 10 may be sperate from or part of the barrier 2 in which the interactive panel 1 is located. In some embodiments the interactive panel 1 may include one or more displays on one or more faces (e.g., first face, second face, or the like which may be an external face and internal face, or three or more faces of a structure, or the like) of the barrier 2. In some embodiments, the one or more displays may comprise an outside panel display 20 having an outside interface 30 (e.g., a graphical user interface, or the like) located on the outside of an area that may be at least partially enclosed, while also having an inside panel display 60 having an inside interface 60 (e.g., a graphical user interface, or the like) located on the inside of the area that may be at least partially enclosed. Alternatively, for a free-standing structure, the interactive panel 1 may have a first panel display 20 on a first face, a second panel display 60 on a second face, and one or more additional panel displays on other faces. The one or more displays 20, 60 (e.g., standard, transparent, or the like, as will be described herein) having the graphical interfaces 30, 70 may be used to provide information to users 204, as will be discussed in further detail herein. The one or more displays may be an electroluminescent display, organic light emitting diode (OLED) display, LED display, LCD display, plasma display, QLED display, DLP display, electronic ink display (which only requires power to change the charge of the ink, which changes the individual pixels to change the image or words on the display), or the like.

Moreover, as will be described in further detail herein, the interactive panel 1 may include one or more energy sources 40, such as a first energy source 42, a second energy source, and/or one or more additional energy sources. It should be understood that the one or more first energy sources may comprise a wired energy source (e.g., 120V, 220V, or the like), a wireless energy source, a battery, or the like. Additionally, or alternatively the interactive panel 1 may have an energy harvesting layer 50, such as over or within at least a portion of the one or more displays (e.g., the outside panel display 20), the barrier 2, and/or other locations of the structure. The energy harvesting layer 50 may be any type of layer such as a screen, a coating, a glazing, film, or other like layer that is able to capture energy from the sun, ambient sources, or other energy generating sources. As will be described herein, the energy harvesting layer 50 may be transparent allowing both the ultraviolet and infrared light to be captured and harvested without impacting the visible transparency of the displays 20, 60. Additionally, or alternatively, the one or more energy sources 40 may comprise kinetic energy capture (e.g., from the wind, from a user opening or closing a sliding door and/or swinging door, and/or a user rotating a revolving door, or the like). In this way, the one or more energy sources 40 may provide power to the interactive panel 1, such as the one or more displays 20, 60, the interactive panel system 210, the one or more detection devices 90 (e.g., one or more sensors 92, communication components 212, or the like), may charge a first energy source 42 (e.g., one or more batteries), or the like.

One or more protective layers 80 may also be located over at least a portion of the one or more displays 20, 60 and/or the one or more energy harvesting panel layers 50. The one or more protective layers 80 may also comprise a screen, coating, glazing, film, or other like layers. The one or more protective layers 80 protect the displays 20, 60 and/or the energy harvesting layer 50 from damage, as will be described in further detail herein.

The interactive panel system 210 that controls the operation of the interactive panel 1 and communicates with one or more detection devices 90, as well as other systems, over a network 202 will be described in further detail with respect to FIG. 12. However, it should be understood that the one or more detection devices 90 may include the one or more communication devices 212 of the interactive panel system 210, the one or more communication devices of other systems, and/or one or more sensors 92 (e.g., cameras, speakers, infrared, near-field communication devices, radio frequency communication, wi-fi interaction, mesh networking, radar, motion sensors, depth sensors, voice recognition, temperature sensor, pressure sensors, or other sensors). The one or more detection devices 90 may be used to identify a user 204 and display information to the users 204. The identity of the user may be the identification of any general user, that is, any user without identifying the actual user and/or any features of the user. Additionally, or alternatively, the one or more detection devices 90 may be used to identify the specific user (e.g., user identifier captured from biometric information—from a finger print, retina scan, facial recognition, or the like—, from a user device—such as a fob, RFID tag, user computer system, such as a smartphone, watch, glasses, implant, or the like—, and/or another user identifier). Additionally, or alternatively, the one or more detection devices 90 may be used to determine conditions in the area, such as but not limited to the weather (e.g., temperature, rain, humidity, or the like), light (e.g., change in natural or artificial light), objects located adjacent the interactive panel 1, or the like. Based on the detection of the user or other condition adjacent the interactive panel 1, the one or more displays 20, 60 (e.g., graphical interfaces) of the interactive panel 1 may be updated, as will be described herein.

As such, the interactive adaptable panel 1 may be used to provide any type of information on the displays 20, 60. For example, the information displayed to the user 204 may be user information (e.g., user profiles, name, title, image, bios, or the like), product information (e.g., information about goods or services, product marking material, entertainment—images, videos, or the like), entity information (e.g., information about entities that provide products, products within the area, entity locations, or the like), business information (e.g., product presentations, designs, models, calculations, research, images, videos, or the like), area information (e.g., directions, weather conditions, light conditions, occupancy information, directions, or the like), or any other information.

FIGS. 2A through 2D illustrate embodiments of the interactive panel 1 when located within a barrier 2 that is a door 6. As illustrated in FIGS. 2A through 2D, the outside face of the door 6 may include the outside panel display 20 and one or more detection devices (e.g., sensors 92, communication components 212, or the like). Additionally, the inside face of the door 6 may include the inside panel display 60 and one or more detection devices (e.g., sensors 92, communication components 212, or the like) of the interactive panel 1. As such, the displays 20, 60 may provide the same or different information to outside users 204A and/or inside users 204B based on the detection devices and/or the preferences of the users 204 and/or the organization operating the interactive panel 1. The information provided based on the detection devices 90 may relate to whether or not the area (e.g., store, room, or the like) is open or closed, is available or occupied (e.g. conference room, office, restroom, or the like), time of availability (e.g., booked throughout the day, available for a specific amount of time, or the like), how many people are located on the inside (e.g., provided on the outside display 20), the weather (e.g., provided on the inside display 60 before leaving), other general information. Moreover, the information may be general (e.g., generic, common, or the like) for any type of user, or the information may be specific user information (e.g., based on the identity of the user approaching the outside display 20, the inside display 60, or the like). It should be understood that each organization utilizing the interactive panel 1 may determine what information is displayed to users 204 based on the preferences of the organization and/or the stored preferences of the users. For example, the organization may program what to provide on the display during different times of day, for general users, for specific users, or the like. Alternatively, or additionally, the users 204 themselves store what each user would like provided on the displays 20, 60 when the user is identified. While the interactive panel 1 of FIGS. 2A through 2D is illustrated as being located within a barrier 2 that is a door 6, additionally, or alternatively, the interactive panel 1, or additional displays thereof, may be located in the walls 8.

Figure 3A:
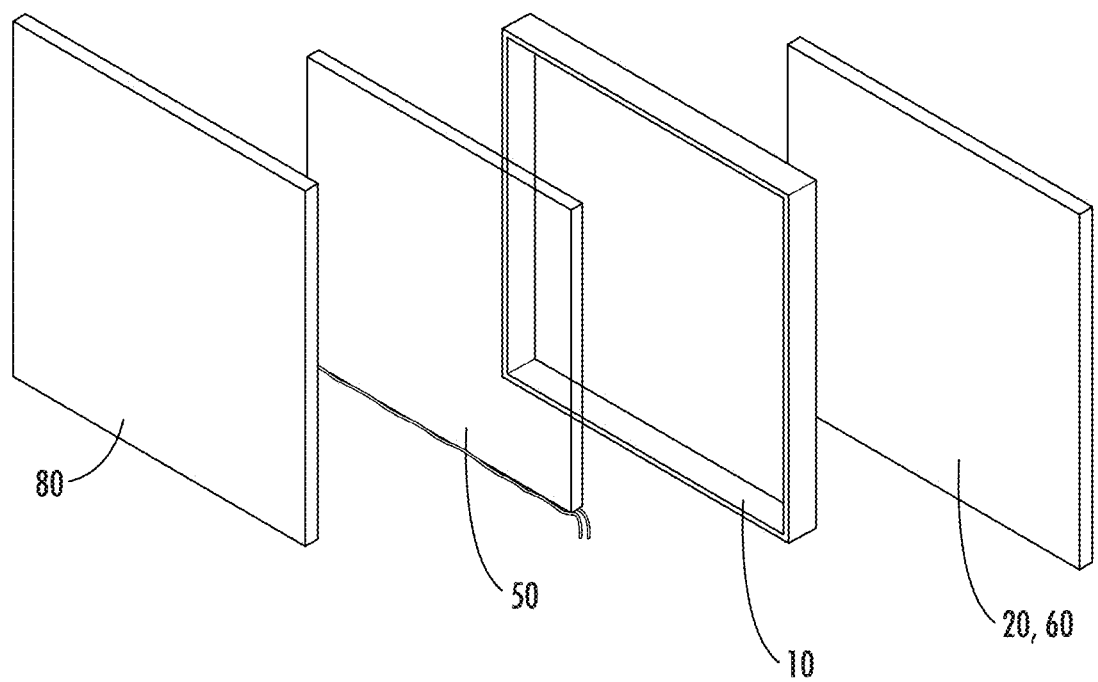
FIG. 3A illustrates an exploded perspective view of a portion of the interactive panel, in accordance with some embodiments of the present disclosure.
Figure 3B:
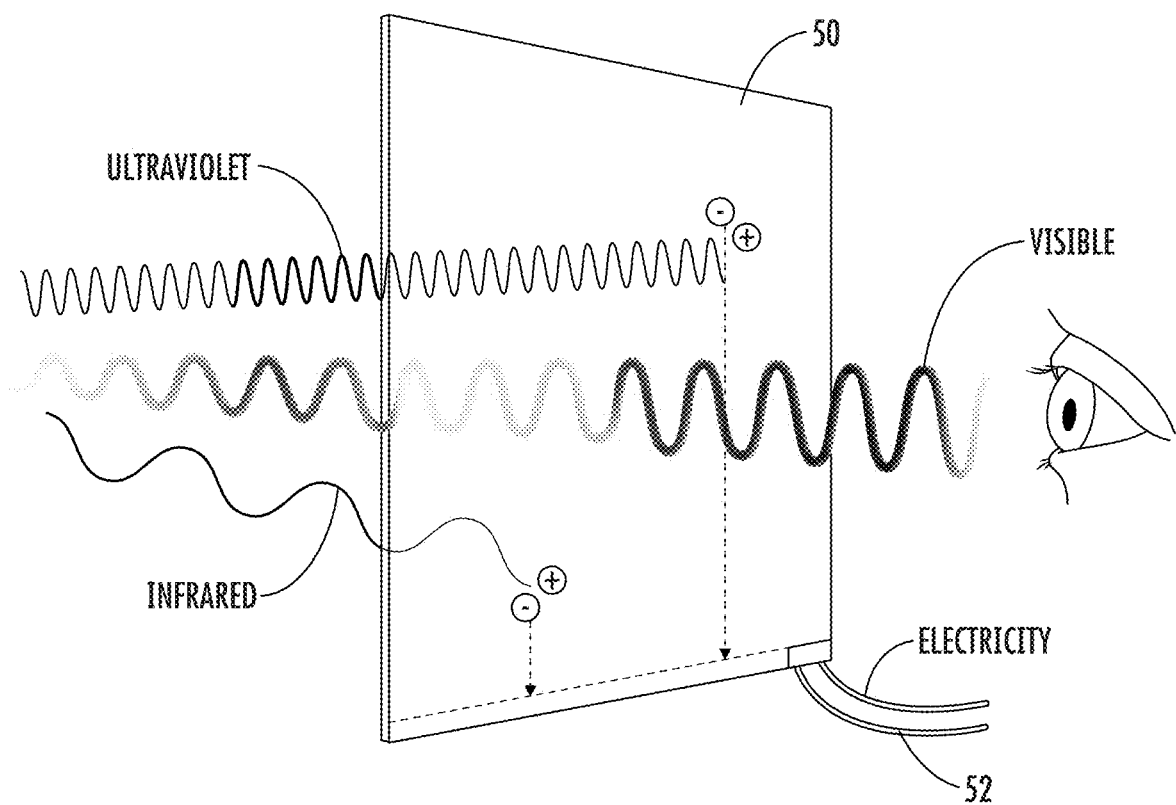
FIG. 3B illustrates a perspective view of an energy harvesting layer of the interactive panel, in accordance with some embodiments of the present disclosure.

FIGS. 3A and 3B illustrate embodiments of the displays 20, 60, and in particular, embodiments of the outside displays 20 of the interactive panels 1. In some embodiments, the interactive panel 1 may have a single display 20 that serves as both the outside display 20 and/or the inside display 60. As such, in some embodiments the one or more displays 20, 60 may be at least partially transparent (e.g., partially transparent, completely transparent, or the like) that is able to display information that may be viewed on either side. Alternatively, the one or more displays 20, 60 may be a single display that illustrates different information on opposite sides of the display, such that different information may be displayed to different users on different sides of the same display. Alternatively, the one or more displays may be two separate displays 20, 60 adjacent to each other (e.g., back-to-back, with components therebetween, or the like) that can display the same or different information on each side of the display. In other embodiments, the interactive display be a single display that only provides information on one side of the barrier 2.

In order to meet the energy consumption of the interactive panel 1 and/or to reduce the reliance on traditional energy sources (e.g., wired connection, or the like), the interactive panel 1 may include one or more energy harvesting layers 50. The one or more energy harvesting layers 50 may be a separate sheet 52 from the protective layer 80 and/or one or more displays 20, 60, and/or it may be a coating, film, glazing, or the like that is applied to the energy harvesting sheet 52, the protective layer 80, and/or the one or more displays 20, 60. The one or more energy harvesting layers 50 may be operatively coupled, using a wired and/or wireless connection, to one or more components of the interactive panel 1, to battery storage that can power the one or more components of the interactive panel 1, or the like in order to operate the interactive panel 1 or to store energy for future operation of the interactive panel 1. FIG. 3A illustrates that the one or more energy harvesting layers 50 are illustrated as being layered on top of the one or more displays 20, 60. As such in some embodiments, when the energy harvesting layer 50 is located on top of the one or more displays 20, 60, the energy harvesting layer 50 may be at least partially transparent to allow a user to see through the energy harvesting layer 50 to the one or more displays 20, 60. Alternatively, in some embodiments, when the energy harvesting layer 50 is located behind the one or more displays 20, 60 (e.g., such displays being at least partially transparent), the energy harvesting layer 50 may or may not be transparent because a user 204 would not have to look through the energy harvesting layer 50 to see the one or more displays 20, 60. Additionally, or alternatively, it should be understood that the one or more energy harvesting layers 50 may be located on different locations of the barrier 2 that may or may not cover a portion of the one or more displays 20, 60. For example, the one or more energy harvesting layers 50 may be located on another section of the face of the door 6 and/or on a wall 8 adjacent to the one or more displays 20, 60.

Regardless of the number or types of the displays 20, 60 and/or the number or locations of the energy harvesting layers 50 (e.g., layered over the displays 20, 60 or located on other locations of the barrier 2), the displays 20, 60 and/or energy harvesting layers 50 may be prone to damage from everyday use. For example, exposure to weather (e.g., wind, rain, projectiles therefrom), artificial conditions (e.g., sporting facilities, laboratory environments, or the like), accidents (e.g., traffic accidents for buildings located adjacent streets, or the like), misappropriators (e.g., users trying to break into an area, vandals, or the like), or other like conditions that may expose the displays 20, 60 and/or the energy harvesting layers 50 to damage. As such, replacing the displays 20, 60 and/or the energy harvesting layers 50, and/or the components thereof, may be expensive due to the costs of displays 20, 60 that have the functionality to display the information described herein and/or the energy harvesting layers 50 used to at least partially power the interactive panel 1. As such, the interactive panel 1 may include one or more protective layers 80 that at least partially cover the one or more displays 20, 60 and/or the one or more energy harvesting layers 50. The protective layer 80 may be a sheet made of any type of material such as laminated glass (e.g., two or more sheets of glass held together by plastic foils), tempered glass, PET plastic screens, TPU plastic screens, or the like Additionally, or alternatively the protective layer may be a coating, glazing, film, or the like applied to a sheet 82, one or more displays 20, 60 and/or the one or more energy harvesting layers 50. The protective layer 80 may provide attack resistance (e.g., force entry (FE), bullet resistance (BR), blast resistance (BR)), projectile resistance (e.g., weather related, such as from winds, or the like), or the like. In some embodiments the one or more protective layers 80 may make the barrier 2, such as the door 6, fire rated, FEMA rated, electromagnetic shielding rated, sound rated, or the like, as will be described in further detail herein.

It should be understood that the one or more protective layers 80 may be layers separate from the displays 20, 60 and/or energy harvesting layers 50, as illustrated in FIG. 3A.

Additionally, or alternatively, the one or more protective layers 80 may be separate layers, which can be removable and/or replaced. As such, should the one or more protective layers 80 be damaged by users, weather, or the like, the one or more protective layers 80 may be replaced without having to replace the one or more displays 20, 60 and/or the one or more energy harvesting layers 50.

Figure 4A:
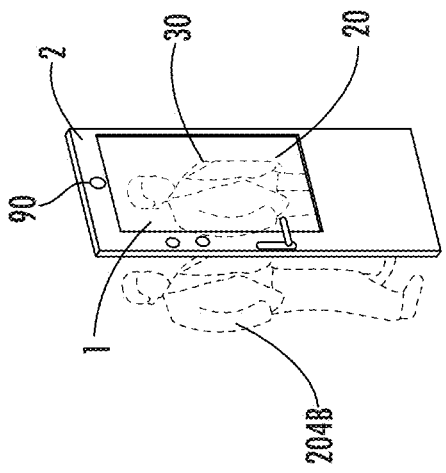
FIG. 4A illustrates a perspective view of an interactive panel in a barrier, such as on the outside face of a door, in accordance with some embodiments of the present disclosure.
Figure 4B:
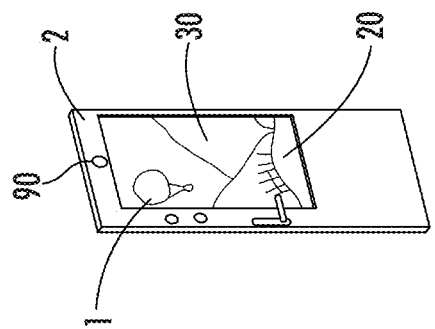
FIG. 4B illustrates a perspective view of an interactive panel in a barrier, such as on the outside face of a door, in accordance with some embodiments of the present disclosure.
Figure 4C:
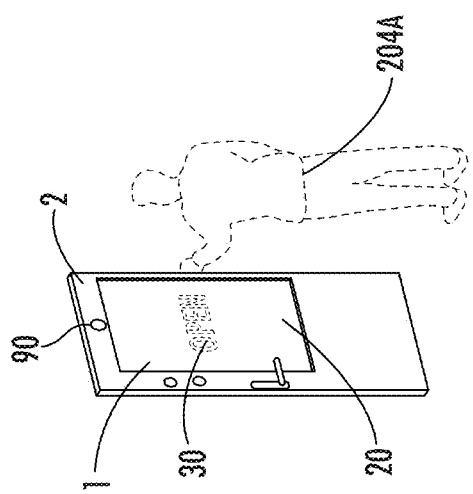
FIG. 4C illustrates a perspective view of an interactive panel in a barrier, such as on the outside face of a door, in accordance with some embodiments of the present disclosure.
Figure 4D:
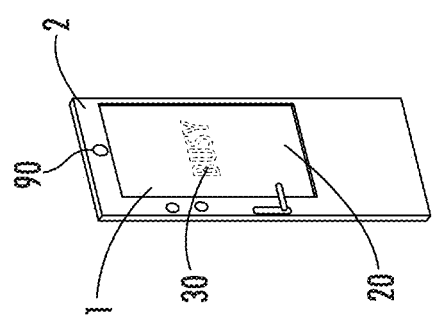
FIG. 4D illustrates a perspective view of an interactive panel in a barrier, such as on the outside face of a door, in accordance with some embodiments of the present disclosure.

FIGS. 4A through 4D illustrate embodiments in which the interactive panel 1 described herein could be used in practice. As illustrated in FIG. 4A, the interactive panel 1 may be used to indicate to outside users 204A on the outside of the barrier 2 when the inside area of the barrier 2 is occupied by one or more inside users 204B. For example, when the one or more detection devices 90 detect that no users 204 are inside of the barrier 2, the outside display 20 may illustrate that the room is available (e.g., a word such as "open", or the like is illustrated on the display). In other embodiments, instead of having a word displayed on the outside display 20, the display 20 may be clear, which may allow outside users 204A to look through the display 20 into the empty area (e.g., empty of users). In other embodiments, as illustrated in FIG. 4B, the interactive panel 1 may be used to indicate to outside users 204A on the outside of the barrier 2 when the inside area of the barrier 2 is occupied by one or more inside users 204B. For example, when the one or more detection devices 90 detect that a user 204 has entered the room (e.g., is inside of the area, or detects that a user has entered the area), the outside display 20 may turn from clear to shaded (e.g., opaque such that no users can been seen through the display 20, translucent such that shapes but not details of the inside users 204B may be seen, or the like) to illustrate that the room is occupied. In other embodiments of the invention, as illustrated in FIG. 4C, the display 20 may illustrate that the room is not available in other ways, such as displaying words like "busy", "occupied", or the like. In still other embodiments, as illustrated in FIG. 4D, the room may be identified as being occupied by illustrating an image on the outside display 20, such as an image of scenery (e.g., cities, landscape, space, or the like), art, users, objects, any type of symbol, or the like.

It should be understood that in some embodiments, the detection device 90 may identify user information about the internal users 204B within the area (e.g., within the room) and display it on the outside display and/or inside display 60. As previously discussed, the user information may include, but is not limited to names, bios, images, information from the user computer systems 220 (e.g., designs, information, displays, or the like from the user's devices) of each of the internal users 204B.

Figure 5:
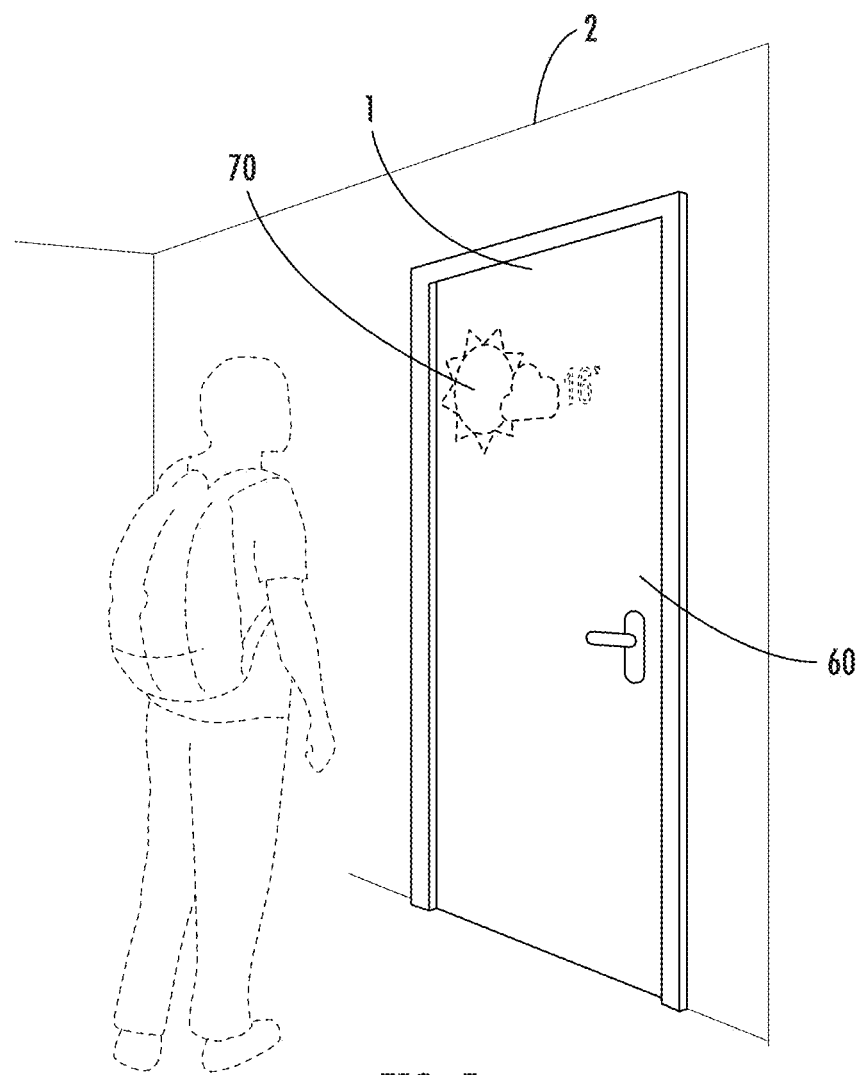
FIG. 5 illustrates a perspective view of an interactive panel in a barrier, such as on the inside face of a door, in accordance with some embodiments of the present disclosure.

FIG. 5 illustrates an alternate use of the interactive panel 1. As illustrated in FIG. 5, the interactive panel 1 may be utilized on the interior of an office, residence, room, or other area. As illustrated in FIG. 5, in some embodiments the interior display 60 may be used as a television, computer screen, or the like, and/or provide information to the user related to weather, news, messages (e.g., text, voicemail, or the like) in which the user may be interested (e.g., as determined based on selections of the user 204, selections of one or more organizations that operator and/or have applications that interface with the interactive panel 1, and/or the like).

Figure 6A:
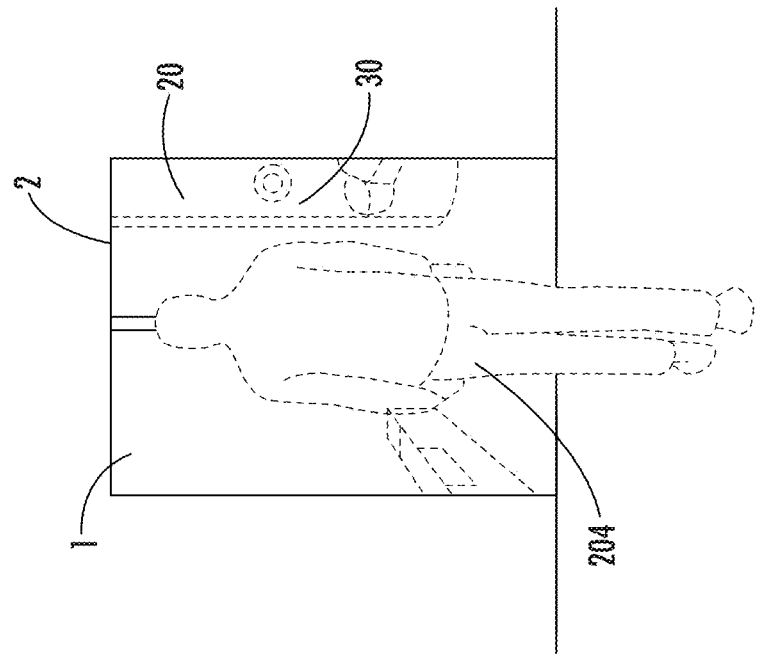
FIG. 6A illustrates a front view of an interactive panel in a barrier, such as on the outside face of one or more doors before a user approaches, in accordance with some embodiments of the present disclosure.
Figure 6B:
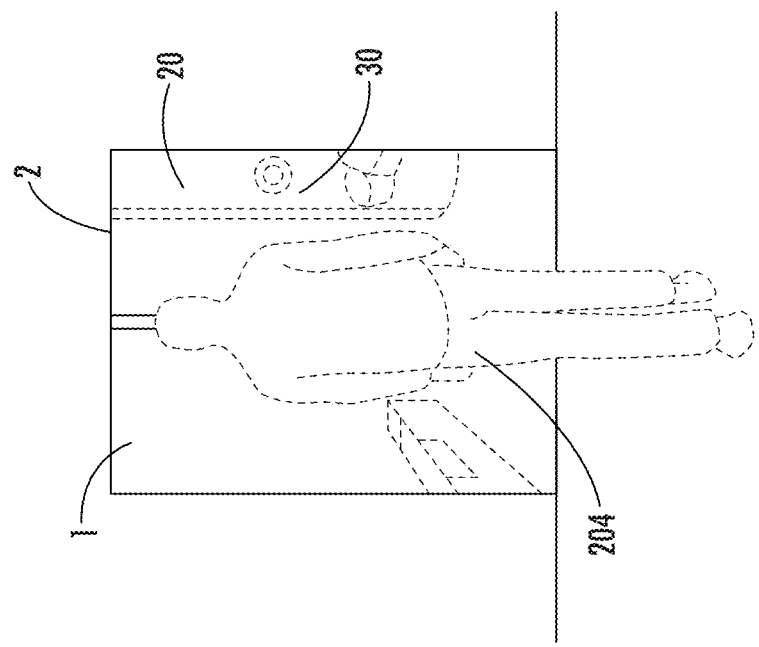
FIG. 6B illustrates a front view of an interactive panel in a barrier, such as on the outside face of one or more doors as a user approaches the door, in accordance with some embodiments of the present disclosure.

FIGS. 6A and 6B illustrate in other embodiments of the invention that as a user 204 (e.g., external user 204A and/or internal user 204B) approaches the barrier 2, the one or more detection devices 90 may identify that a user 204 is approaching. As the user 204 approaches the barrier 2, the display 20, 60 may change, as previously discussed herein.

Figure 6C:
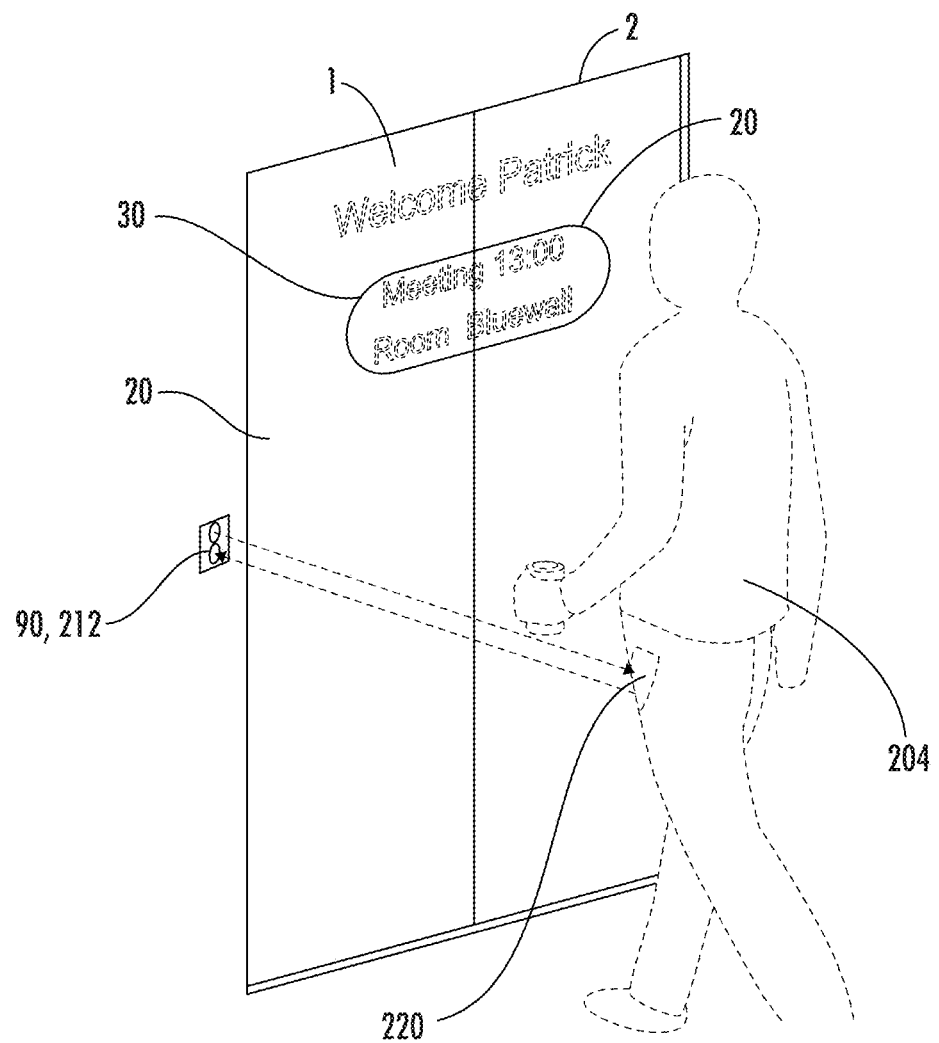
FIG. 6C illustrates a perspective view of an interactive panel in a barrier, such as on the outside face of one or more doors as a user approaches the door, which communicates with a user device, in accordance with some embodiments of the present disclosure.

For example, the display 20, 60 may change from one state to another (e.g., opaque to translucent, or the like, from one image to another, from displaying one type of information to another type of information, or the like). It should be understood that in some embodiments, the one or more detection devices 90 may be sensors 92 (e.g., a camera, radar, lasers, LiDAR, or the like) that generally identifies the presence of any user 204, or may be a sensor 92 that is able to receive a user identifier (e.g., characters—numbers, symbols, and/or letters, images, biometrics—facial recognition, fingerprints, eye scan, or the like, or other like identifier) and compare the captured identifier with stored identifiers in order to identify the particular user 204 and display specific information to the specific user 204. In other embodiments, as illustrated in FIG. 6C, as the user 204 approaches the interactive panel 1, the interactive panel 1 (e.g., a communication device 212 of the interactive panel 1 or computer system operatively coupled to the interactive panel 1) may communicate with a user device of the user (e.g., RFID tag, fob, a communication device 222 of the user computer system 220, or the like). The communication between the interactive panel 1 and the user device may identify the user 204 approaching the door 6, and in response the interactive panel 1 may provide on the display 20, 60 the information for the specific user identified. For example, the specific information may be specific user information (e.g., a welcome message, information about a meeting, information about the subject of a meeting, product in which the user may be interested in, or the like).

It should be further understood that in some embodiments, the one or more detection devices 90 may be used to control access to the area. For example, the door 6 may unlock when a user 204 is authorized for access to the area and/or a door opener may automatically open the door for the user 204. Additionally, or alternatively, with respect to using the user device to receive information on the display 20, 60 and/or be authorized to access the area, the user 204 may be required to make a gesture, use a touch feature on the display 20, 60, provide a voice command, provide biometric data, or the like to see the information and/or to unlock the door 6 and access the area.

Figure 7:
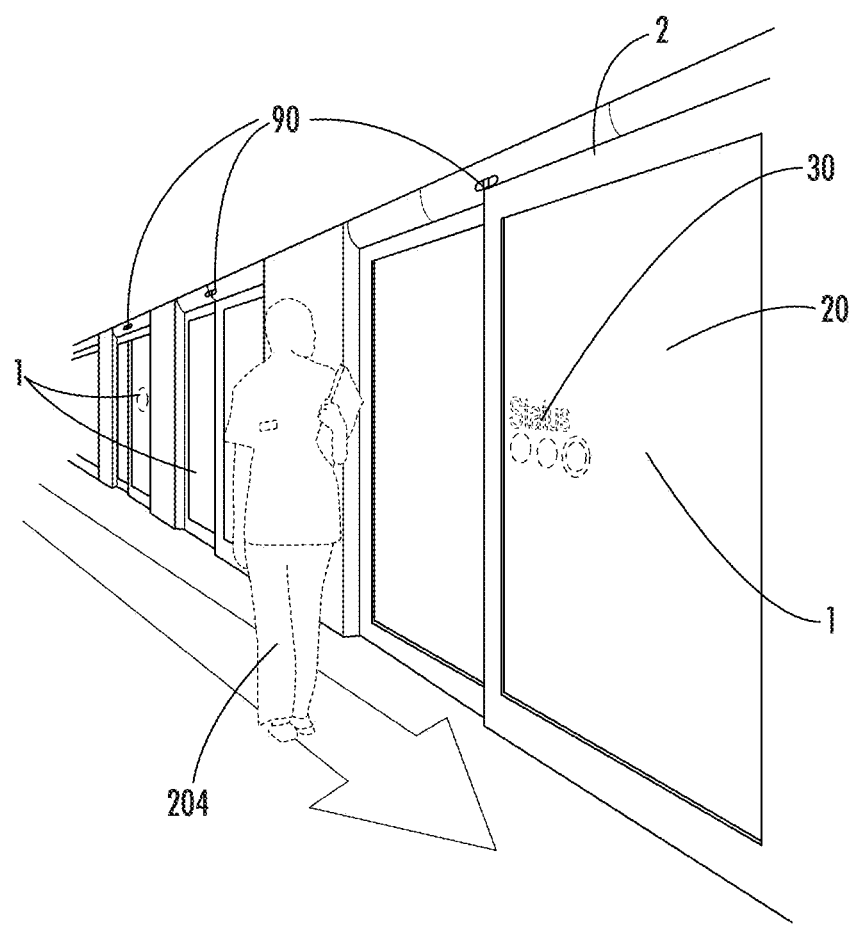
FIG. 7 illustrates a perspective view of interactive panels in a barrier, such as on the outside face of one or more doors and/or walls as a user approaches the interactive panels, in accordance with some embodiments of the present disclosure.
Figure 8:
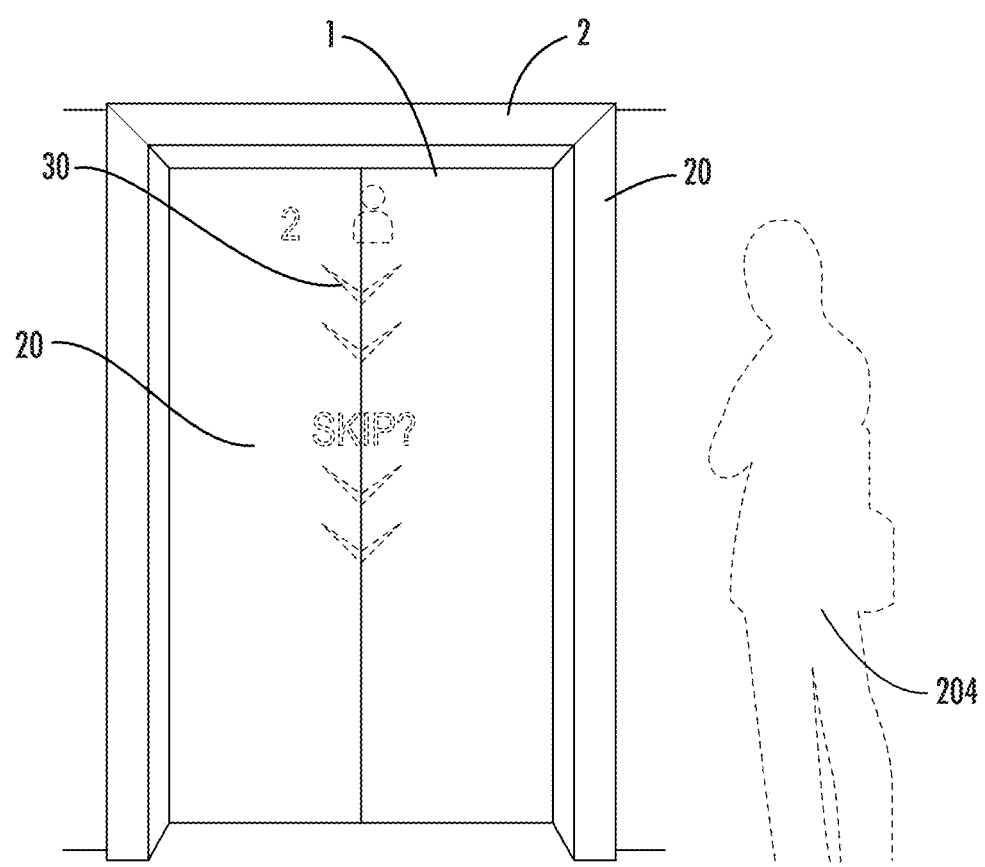
FIG. 8 illustrates a perspective view of an interactive panel in a barrier, such as on the outside face of one or more elevator doors as a user waits, in accordance with some embodiments of the present disclosure.

FIG. 7 further illustrates embodiments of the invention in which one or more interactive panels 1 are utilized in multiple barriers 2, such as multiple doors 6 and/or walls 8 within a structure (e.g., a building). As illustrated in FIG. 8, as the user 204 walks past the multiple barriers 2, the detection devices 90 may identify the presence of the user 204, and in some embodiments may change the display (e.g., turn from clear to opaque or translucent, display) and/or provide information on the displays 20, 60 of the interactive panels 1. For example, the information may follow the user 204 as the user passes the multiple barriers 2 (e.g., each successive interactive panel 1 provides the information as the user 204 walks by each successive interactive panel 1). Moreover, in some embodiments, the interior display 60 may be updated with information when the user enters the room. In some embodiments, the particular operation of the interactive panel 1 may be beneficial in retail use (e.g., providing information to general users or specific users about entities, products, directions, or the like), hospital use (e.g., identifying doctors and/or nurses that enter the room, are assigned to the patient, directions within the hospital, tests run, schedules for the patients, or the like), transportation use (e.g., identifying common or specific travel information to the users 204, directions, information about products—goods or services, or the like), office use (e.g., providing information regarding meetings, occupancy, products, directions, or the like), or other like uses.

FIG. 8 illustrates that in some embodiments, the interactive panel 1 may be used within elevator doors 6. As illustrated in FIG. 8, the displays 20, 60 may illustrate information related to the operation of the elevator (e.g., direction, number of occupants, number of people waiting on floor above or below from which direction the elevator is arriving, or the like). Additionally, or alternatively, the displays 20, 60 may be the control for the elevator, such as selecting a floor, calling the elevator, requesting assistance, holding open the doors, closing the door, skipping an approaching elevator based on the number of occupants, or the like may be requested through touchscreens on the displays 20, 60. As previously discussed herein, the interactive panel 1 of the elevator may include detection devices 90 that may be used to provide information (e.g., general information, specific information, or the like) to the user when the presence of the user is detected (e.g., directions on the floors, product information, entity information, or the like).

Figure 9A:
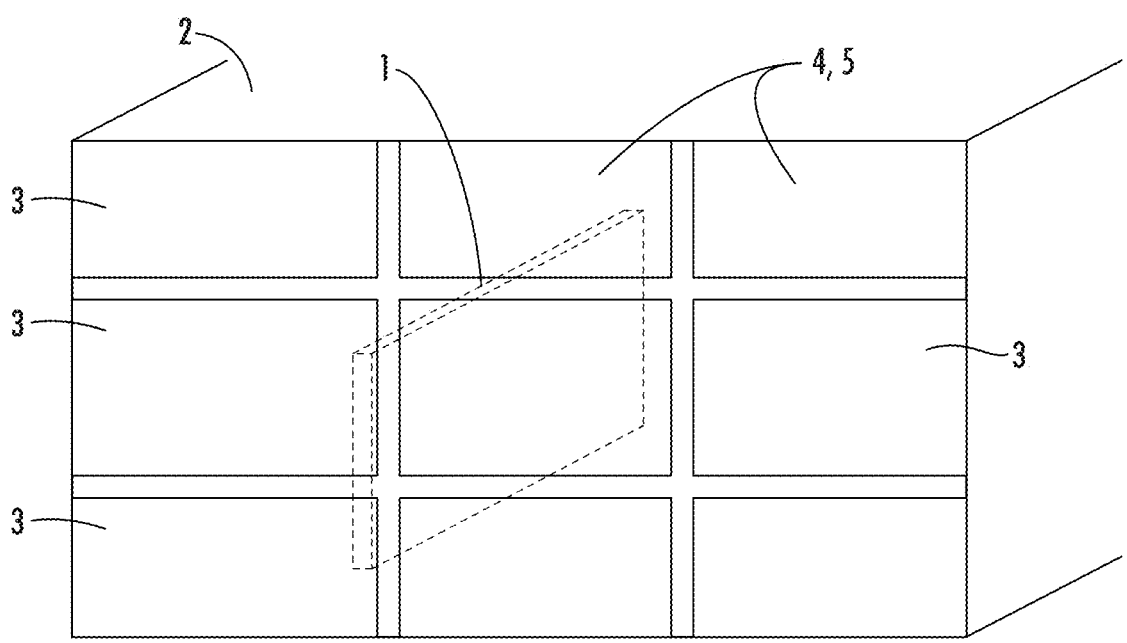
FIG. 9A illustrates a perspective view of an adaptable interactive panel used within a wall barrier, in accordance with some embodiments of the present disclosure.
Figure 9B:
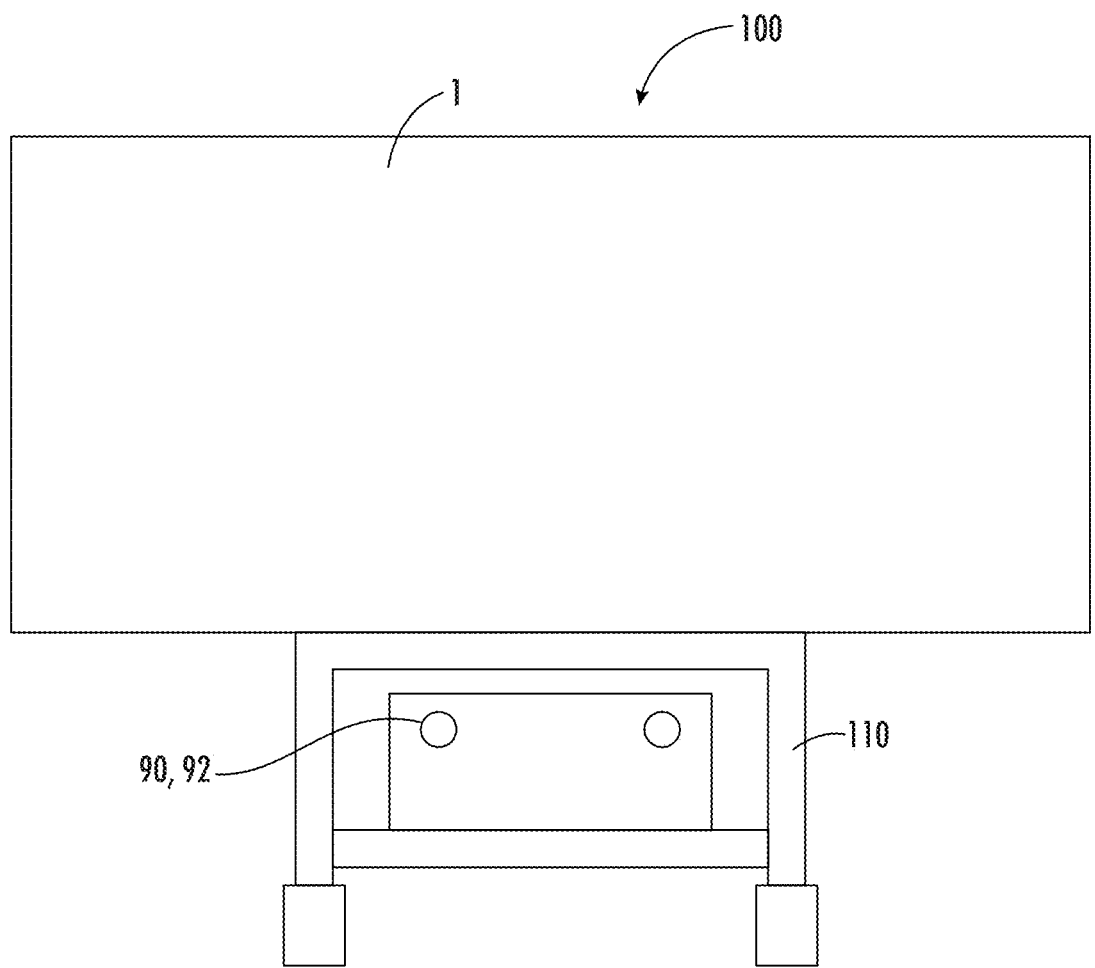
FIG. 9B illustrates a front view of an adaptable interactive panel used within a mobile support, in accordance with some embodiments of the present disclosure.
Figure 9C:
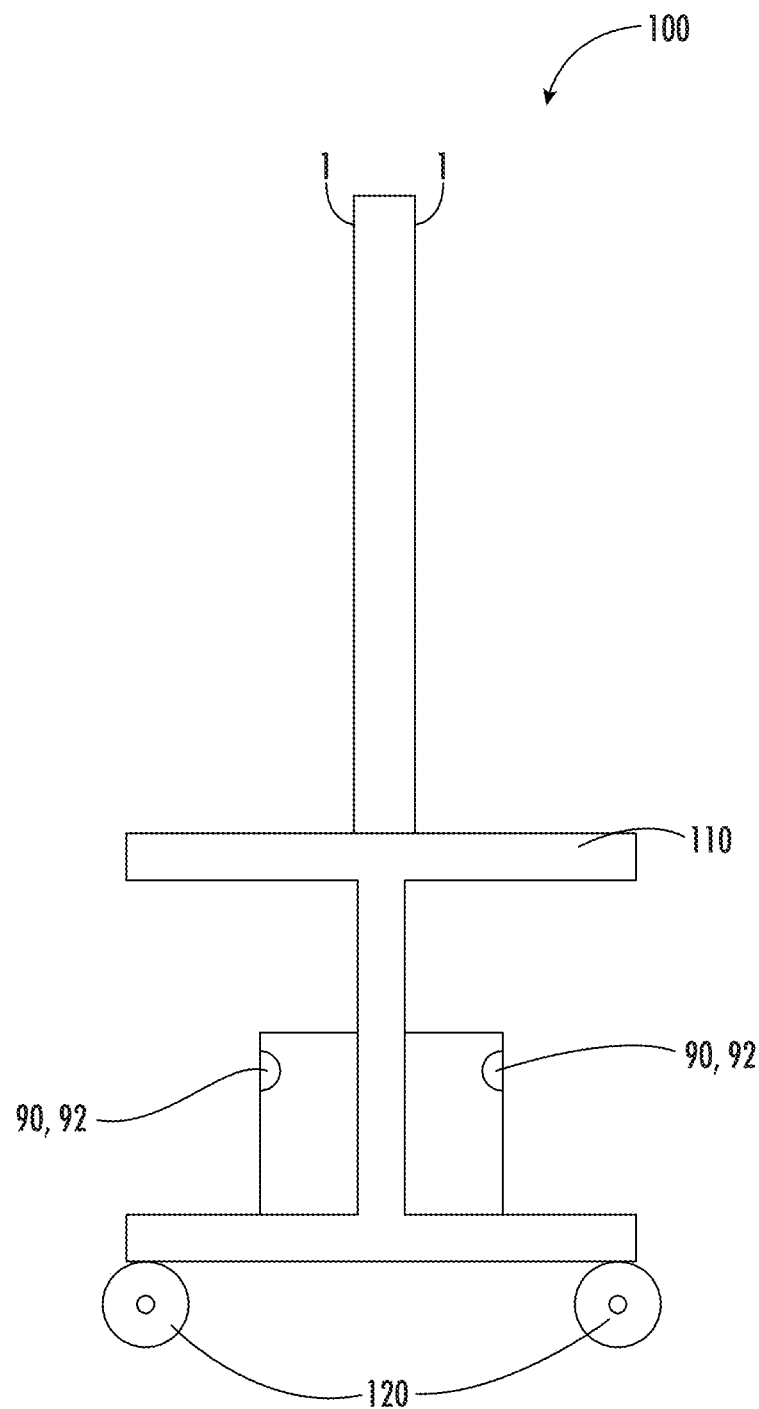
FIG. 9C illustrates a side view of the adaptable interactive panel used within a mobile support of FIG. 9B, in accordance with some embodiments of the present disclosure.

As illustrated in FIGS. 9A through 9C, the interactive panel 1, may be an adaptable interactive panel 1 that may be incorporated into a barrier 2 and/or be removed from a barrier 2. For example, as illustrated in FIG. 9A, the adaptable interaction panel 1 may be incorporated into a barrier 2 between two adjacent areas (e.g., a wall 4 between two adjacent rooms). The panel housing 2 may be adaptable between the rooms, such as adjustable, such as pivotable (e.g., vertically, horizontally, or the like), removeable (e.g., removed and flipped, or the like), or the like to allow the panel display 20 to be viewable from either of the two adjacent areas (e.g., a first area or a second area on opposite sides of the barrier 2). The barrier 2 is illustrated as having one interactive adaptable panel 1, and one or more other sections, which may be a wall 4, window 5 (e.g., opaque, translucent, transparent, or the like), or the like. However, in some embodiments, the barrier 2 may also have one or more static interactive panels 3 adjacent the interactive adaptable panel 1. In alternate embodiments, the barrier 2 may have multiple interactive adaptable panels 1. Regardless of the configuration, the adjustable panels may be rotated back and forth between adjacent sides of the barrier 2 to display information to users on either side of the barrier 2.

It should be understood that in some embodiments, the panel housing 2 may allow for the adaptable interactive panel 1 to be removed from the barrier 2 and/or used as a user device (e.g., hand-held user device, or the like). As such, users 204 are able to use the adaptable panel 1 in various ways to share information with other users.

Alternatively, or additionally, as illustrated in FIGS. 9B and 9C, the interactive adaptable panels 1 may be removable from the barrier 2 through the use of being operatively coupled to a mobile support 110 of a mobile interactive panel system 100 (e.g., a mobile adaptable interactive panel system, or the like). It should be understood that the mobile panel system 100 may be a part of the barrier 2, and as such, may operate either within the barrier 2 or apart from the barrier 2. Alternatively, the mobile interactive panel system 100 is a separate mobile support 110 that is not a part of the barrier 2, and instead the adaptable interactive panel 1 may be removed from the barrier 2 and operatively coupled to the mobile support 110.

Regardless of how one or more interactive panels 1 are incorporated into the mobile panel system 100, the mobile interactive panel system 100 may be manually moved, or autonomously moved through an automated system 120

(e.g., motor, wheels, drive train—gears, belts, tracks, or the like—movement sensors—radar, NFC, cameras, or the like). It should be understood that the mobile interactive panel system 100 may be used to travel around offices, public spaces, shopping centers, sporting events, or the like and used to display information as will be described herein.

In some embodiments, the adaptable interactive panel 1 may be utilized on the interior of an office, residence, room, or other area. In some embodiments the display 20 may be used as a television, computer screen, or the like, and/or provide information to the user related to weather, news, messages from friends, co-workers, companies, applications, organizations, or the like (e.g., via notifications, texts, voicemails, or the like) in which the user may be interested (e.g., as determined based on selections of the user 204, selections of one or more organizations that operate and/or have applications that interface with the interactive panel 1, and/or the like). In some embodiments, the display 20 may be updated with information when the user 204 enters the room. For example, the adaptable interactive panel 1 may be able to identify a user and update the display 20 with information based on the presence of the user and/or the identification of the specific user, as will be discussed below.

In other embodiments of the invention, a user 204 may approach the adaptable interaction panel 1, and in particular, the mobile interactive panel system 100 (e.g., either stationary, or as it is moving) and the one or more detection devices 90 may identify that a user 204 is approaching and/or detect different locations in which the mobile interactive panel system 100 is located (e.g., as it moves to different locations). As such, as the user 204 approaches the barrier 2 and/or as the mobile interactive panel system 100 identifies it surroundings (e.g., new locations), the display 20 may change and/or provide information to the user 204. For example, the display 20 may change from one state to another (e.g., from one image to another, from displaying one type of information to another type of information, or the like). It should be understood that in some embodiments, the one or more detection devices 90 may be sensors 92 (e.g., a camera, radar, or the like) that generally identifies the presence of any user 204 (e.g., general user), or may be a sensor 92 that is able to receive a user identifier (e.g., characters—numbers, symbols, and/or letters, images, biometrics—facial recognition, fingerprints, eye scan, or the like, or other like identifier) and compare the captured identifier with stored identifiers in order to identify the particular user and display specific information to the specific user. In other embodiments, the user 204 approaches the adaptable interactive panel 1, the interactive panel 1 (e.g., a communication device 212 of the interactive panel 1) may communicate with a user device of the user (e.g., RFID tag, fob, a communication device 222 of the user computer system 220, or the like). The communication between the adaptable interactive panel 1 and the user device may identify the user 204 approaching, and in response the adaptable interactive panel 1 may provide on the display 20 the information for the specific user identified. For example, the specific information may be specific user information (e.g., a welcome message, information about a meeting, information about the subject of a meeting, product in which the user may be interested in, or the like).

In some embodiments, the particular uses of the adaptable interactive panel 1 may be beneficial in retail use (e.g., providing information to general users or specific users about the entity, products, directions, or the like), hospital use (e.g., identifying doctors and/or nurses that enter the room, are assigned to the patient, directions within the hospital, tests run, schedules for the patients, or the like), transportation use (e.g., identifying common or specific travel information to the users 204, directions, information about products—goods or services, or the like), office use (e.g., providing information regarding meetings, occupancy, products, directions, or the like), factory use (e.g., providing information regarding components needed, schedules, manufacturing targets, processes, or the like), or other like uses.

Figure 10A:
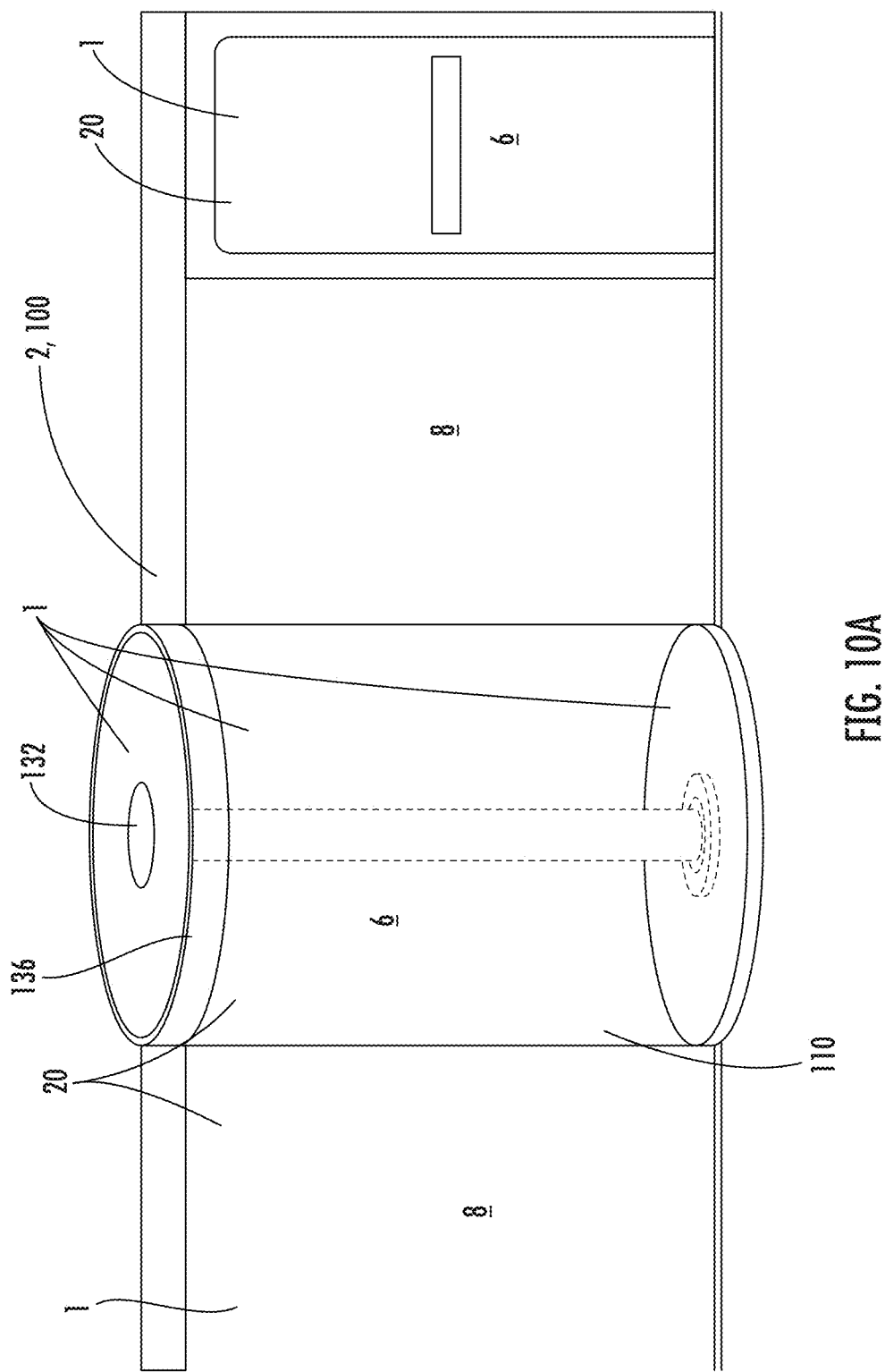
FIG. 10A illustrates a perspective view of an interactive panel in a barrier, such as within one or more revolving doors and/or walls, in accordance with some embodiments of the present disclosure.
Figure 10B:
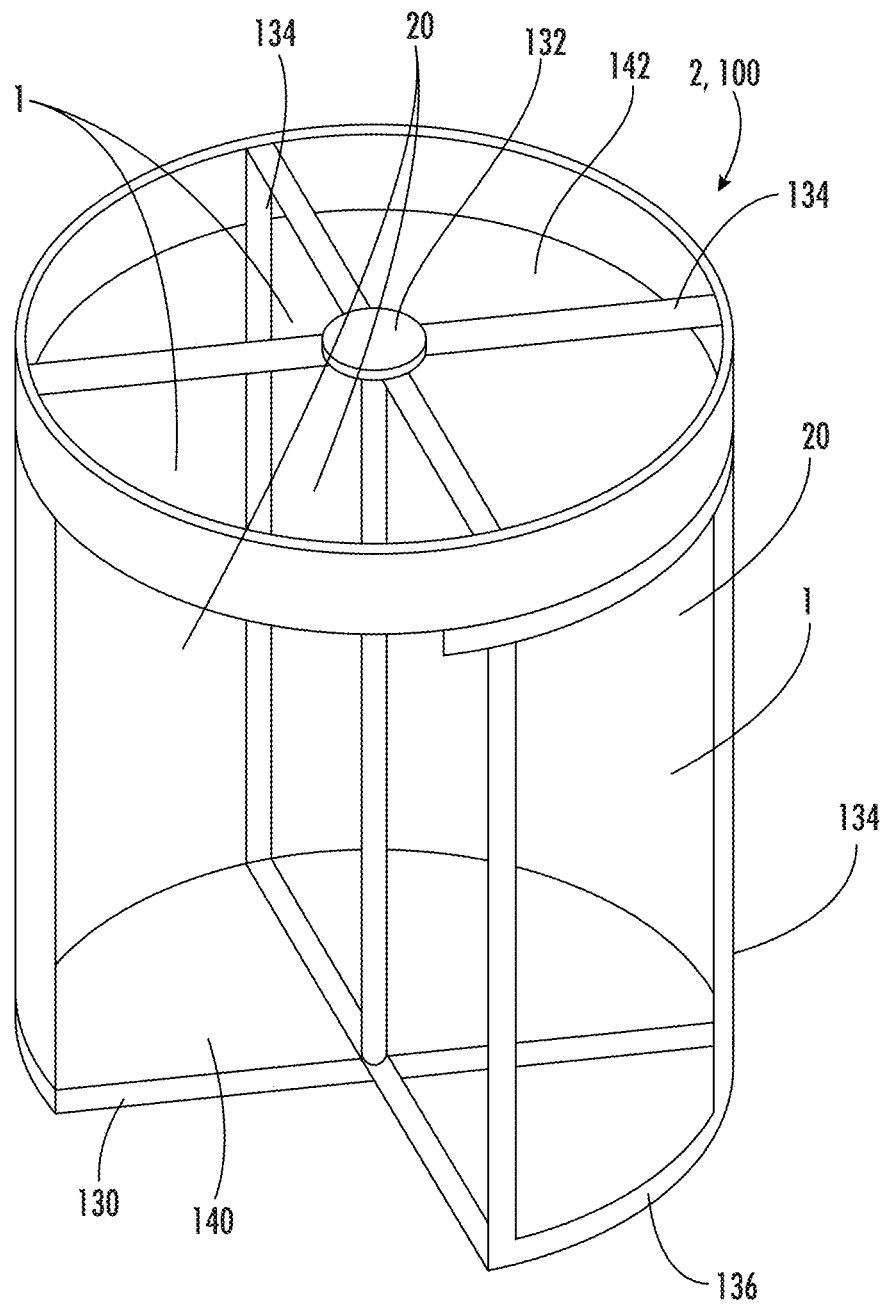
FIG. 10B illustrates a perspective view of an interactive panel in a barrier, such as within one or more revolving doors, in accordance with some embodiments of the present disclosure.

FIGS. 10A and 10B illustrate embodiments in which the interactive panels 1 may be included in and/or adjacent to revolving door systems 100. Revolving door systems 100 may include curved outer surfaces 110, interior wings 120, a frame 130 (e.g., center shaft 132, wing frames 134, curved frames 136, or the like), a floor 140, and/or a ceiling 142. As such, the interactive panel 1 may be located in a wall 8 and/or door 6 adjacent the revolving door system 100 and/or in the curved surfaces 110 and/or in the interior wings 120 of the revolving door system 100. As previously described herein with respect to the other embodiments, one or more interactive panels 1 may be used to identify the presence of a user 204 (e.g., any general user, such as a common or generic user, any specific users, or the like) and in response provide information to the user 204. As previously discussed, the information may include product information, entity information, user information, busines information, or the like. The information presented to the users 240 may be integrated between the adjacent wall 8, the curved surfaces 110, the interior wings 120, the floor 140 and/or the ceiling 142. As such, the information may span one or more of these surfaces, and thus, may be integrated across these surfaces. Additionally, or alternatively, the information may change as the user passes by the wall 8, the curved surfaces 110, enters the revolving door system 100, moves with the interior wings 120, and/or exits the revolving door system 100.

As previously described herein, the interactive panel 1 of the revolving door system 100, like the other interactive panels 1, may have the energy harvesting layers 50 previously discussed herein. Additionally, or alternatively, the one or more energy sources 40 may further comprise mechanical energy capture (e.g., capture of kinetic energy). For example, the revolving door system 100 may have a kinetic energy capture device 150 (e.g., in the center shaft 132, the floor 140, the ceiling 142) that captures energy as the users 204 turn the revolving door 6. In this way, the kinetic energy capture device 150 may be used to at least partially power the interactive panel 1 directly or indirectly (e.g., through storage of the energy in a battery that powers the interactive panel 1). In other embodiments, it should be understood that sliding doors, swinging doors, or other types of doors 6 that are manually operated may include one or more kinetic energy capture devices 150.

Moreover, as previously discussed herein the revolving door system 100 may include one or more protective layers 80 on the inside or outside of the curved surfaces 110 and/or the interior wings 120. The protective layer 80, as previously discussed herein, protects the displays 20, 60 and/or the energy harvesting layers 50 from damage. The protective layer 80 may be made from a sheet, coating, film, glazing, or the like. The protective layer 80 may be removeable should it be damaged.

Figure 11A:
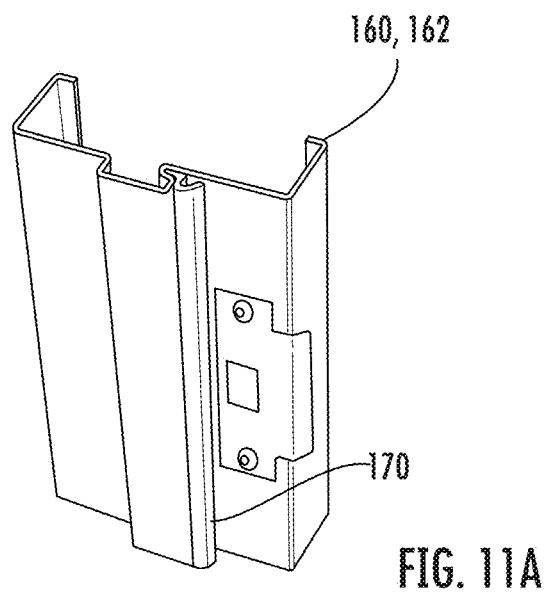
FIG. 11A illustrates a perspective view of a door frame, in accordance with some embodiments of the present disclosure.
Figure 11B:
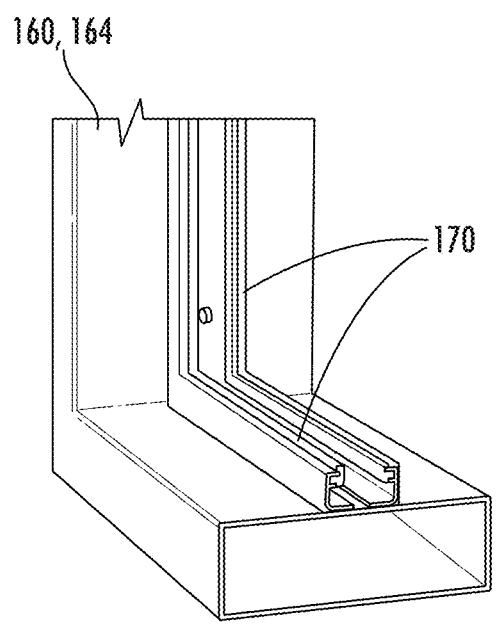
FIG. 11B illustrates a perspective view of a sliding door frame, in accordance with some embodiments of the present disclosure.

As illustrated in FIGS. 11A and 11B, frames 160 (e.g., swinging door frames 162 in FIG. 11A, sliding door frame 164 in FIG. 11B, or the like), the revolving door frames 130 illustrated in FIGS. 10A and 10B, the panel housings 10 (e.g., panel frames, window frames, or other like frames), and/or the walls 2, floor, and/or ceiling adjacent the interactive panel 1 may provide locations for storing the components of the interactive panel 1. For example, the one or more panel energy sources 40 (e.g., batteries, wires, or the like), the detection devices 90 (e.g., the sensors 92, or the like), and/or the interactive panel systems 210, or the like) may be at least partially stored within the frames 160, 130, and/or panel housings 10. As such, the one or more frames 160, 130 and/or panel housings 10 may be made of hollow metal, aluminum, composites, or the like that can be used to store components and/or route wires. Furthermore, the one or more frames 160, 130, doors 6, interactive panels 1, walls 8, ceiling, floors, seals 170 (e.g., seals 170 (kerf seals, gaskets, fin seals, or the like) may have properties that provide various security features, such as forced entry resistance, bullet or ballistic resistance, EMC shielding, sound rating, fire and/or smoke ratings, and/or other like security features, as will be described in further detail below.

Figure 12:
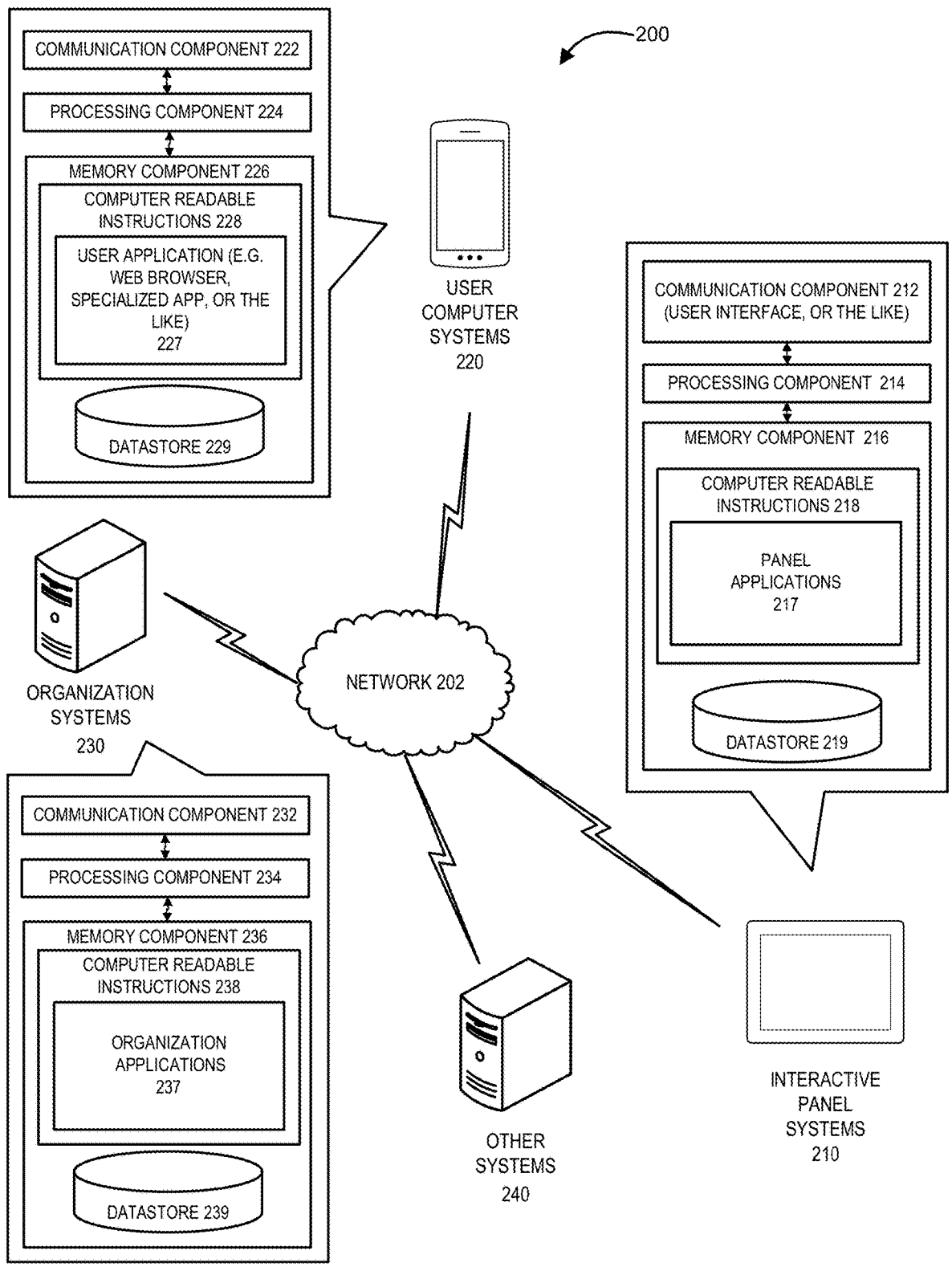
FIG. 12 illustrates an interactive panel network diagram, in accordance with some embodiments of the present disclosure.

FIG. 12 illustrates a interactive panel network 200, in accordance with embodiments of the present disclosure. The interactive panel network 200 may allow different interactive panels 1 (e.g., the interactive panel systems 210 thereof) to communicate with the user devices (e.g., the user computer systems 220, or the like), the organization systems 230, and/or other systems 240 to operate as discussed herein. As illustrated in FIG. 12, one or more interactive panel systems 210 are operatively coupled, via a network 202, to one or more user computer systems 220, one or more organization systems 230, and/or one or more other systems 240 (e.g., other device systems, third party systems, or the like). In this way, the interactive panel systems 210 may communicate with the one or more user computer systems 220, organization systems 230, and/or one or more other computer systems 240 for determining and displaying information on the one or more panel displays 20, 60. While the systems 210, 220, 230, 240 are illustrated as separate systems, it should be understood that two or more of the systems may be combined such that the systems operate as single system, and/or the individual systems 210, 220, 230, 240 may be split into additional systems.

The communications between the systems 210, 220, 230, 240 may occur over a network 202. The network 202 may be a global area network (GAN), such as the Internet, a wide area network (WAN), a local area network (LAN), or any other types of network or combination of networks. The network 202 may provide for wireline, wireless, or a combination of wireline and wireless communication between systems, servers, components, and/or devices on the network 202.

As illustrated in FIG. 12, the interactive panel systems 210 (e.g., one or more interactive panel systems 210) may generally comprise one or more communication components 212, one or more processing components 214, and one or more memory components 216. The one or more processing components 214 are operatively coupled to the one or more communication components 212, and the one or more memory components 216. As used herein, the term "processing component" generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

The one or more processing components 214 use the one or more communication components 212 to communicate with the network 202 and other components on the network 202, such as, but not limited to, the components of the one or more user computer systems 220, the one or more organization systems 230, and/or the one or more other computer systems 240. As such, the one or more communication components 212 generally comprise a wireless transceiver, modem, server, electrical connection, electrical circuit, or other component for communicating with other components on the network 202. The one or more communication components 212 may further include an interface that accepts one or more network interface cards, ports for connection of network components, Universal Serial Bus (USB) connectors, or the like. Moreover, the one or more communication components 212 may include a keypad, keyboard, touch-screen, touchpad, microphone, mouse, joystick, other pointer component, button, soft key, and/or other input/output component(s) for communicating with the users 204. In some embodiments of the invention, the one or more communication components 212 may be used to communicate with, or be integrated with, the one or more sensors 92. In some embodiments, as described herein the one or more communication components 212 may comprise a user interface, such as a graphical user interface that allows a user 204 to utilize the interactive panels 1.

As further illustrated in FIG. 12, the one or more interactive panel systems 210 comprise computer-readable instructions 218 stored in the one or more memory components 216, which in some embodiments includes the computer-readable instructions 218 of the one or more interactive panel applications 217 (e.g., used allow the interactive panel 1 to detect users and/or conditions of the area, interface with other systems or devices, provide information on the displays 20, 60, run third party applications, or the like). In some embodiments, the one or more memory components 216 include one or more data stores 219 for storing data related to the one or more interactive panel systems 210, including, but not limited to, data created, accessed, and/or used by the one or more interactive panel systems 210.

As illustrated in FIG. 12, one or more user computer systems 220 may communicate with each other, the one or more interactive panel systems 210, the one or more organization systems 230, and/or other systems 240 in order to exchange information with the interactive panel systems 210 and/or the organization systems 230. Consequently, the one or more users 204 may be users affiliated with an organization (e.g., employees, agents, representatives, officers, or the like) that are interacting with the interactive panel systems 210. Alternatively, the one or more users 204 may be any users in the public (e.g., customer, located adjacent the adaptable panel systems 210, or the like). The one or more user computer systems 220 may be a desktop, laptop, tablet, mobile device (e.g., smartphone device, wearable device—watch, glasses, gloves, implant, or the like, or any other type of mobile device), or any other type of computer that generally comprises one or more communication components 222, one or more processing components 224, and one or more memory components 226.

The one or more processing components 224 are operatively coupled to the one or more communication components 222, and the one or more memory components 226. The one or more processing components 224 use the one or more communication components 222 to communicate with the network 202 and other components on the network 202, such as, but not limited to, the one or more interactive panel systems 210, the one or more organization systems 230, and/or the other systems 240. As such, the one or more communication components 222 generally comprise a wireless transceiver, modem, server, electrical connection, or other component for communicating with other components on the network 202. The one or more communication components 222 may further include an interface that accepts one or more network interface cards, ports for connection of network components, Universal Serial Bus (USB) connectors and the like. Moreover, the one or more communication components 222 may include a keypad, keyboard, touch-screen, touchpad, microphone, mouse, joystick, other pointer component, button, soft key, and/or other input/output component(s) for communicating with the users 204. In some embodiments of the invention the one or more communication components 222 may be used to communicate with one or more sensors 92. In some embodiments, as described herein the one or more communication components 212 may comprise a user interface, such as a graphical user interface that allows a user 204 to utilize the user computer systems 220.

As illustrated in FIG. 12, the one or more user computer systems 220 may have computer-readable instructions 228 stored in the one or more memory components 226, which in some embodiments includes the computer-readable instructions 228 for user applications 227, such as dedicated applications (e.g., apps, applet, or the like), portions of dedicated applications, a web browser or other apps that allow access to applications located on other systems, or the like. In some embodiments, the one or more memory components 226 include one or more data stores 229 for storing data related to the one or more user computer systems 220, including, but not limited to, data created, accessed, and/or used by the one or more user computer systems 220. The user application 227 may interface with the applications of the one or more interactive panel systems 210, the one or more organization systems 230, and/or one or more other computer systems 240 in order to communicate with other systems on the network 202. The user computer applications 227 may include operating platforms (e.g., IOS, Android, or the like) that allow for the use of program applications, such as the applications that control the processes described herein (e.g., allowing for the adaptability of, providing information to, receiving information from, or the like the interactive panel systems 210).

It should be understood that the embodiments described herein discuss using a user computer system 220, such as a graphical user interface of the user computer system 220, to interact and interface with the interactive panel systems 210. However, it should be understood that the embodiments described herein may be implemented through any type of user interface, such as a physical interface comprising a button, switch, or other physical interface, a voice command interface that can determine voice commands, a visual interface that can determine user gestures, biometric interface (e.g., facial recognition, fingerprints, eye scan, or the like), or other like interface that is used by the user in order to interact with and/or display information on the interactive panel 1 (e.g., as a part of the interactive panel systems 210 and/or the user device, such as the user computer system 220, or the like). Additionally, or alternatively, it should be understood that a user 204 my interact with the interactive panel system 210 directly or indirectly without the need for using a user computer system 220.

Moreover, as illustrated in FIG. 12, the one or more organization systems 230 may communicate with the one or more interactive panel systems 210, the user computer systems 220, and/or other computer systems 240 in order to receive information from and/or send information to the other systems over the network 202 to allow for the use of the interactive panel systems 210. Consequently, the one or more organization systems 230 may generally comprise one or more communication components 232, one or more processing components 234, and one or more memory components 236.

The one or more processing components 234 are operatively coupled to the one or more communication components 232, and the one or more memory components 236. The one or more processing components 234 use the one or more communication components 232 to communicate with the network 202 and other components on the network 202, such as, but not limited to, the one or more interactive panel systems 210, the one or more user computer systems 220 (or other user interface), and/or the other computer systems 240. As such, the one or more communication components 232 generally comprise a wireless transceiver, modem, server, electrical connection, or other component for communicating with other components on the network 202. The one or more communication components 232 may further include an interface that accepts one or more network interface cards, ports for connection of network components, Universal Serial Bus (USB) connectors and the like. Moreover, the one or more communication components 232 may include a keypad, keyboard, touch-screen, touchpad, microphone, mouse, joystick, other pointer component, button, soft key, and/or other input/output component(s) for communicating with the users 204.

As illustrated in FIG. 12, the one or more organization systems 230 may have computer-readable instructions 238 stored in the one or more memory components 236, which in some embodiments includes the computer-readable instructions 238 for organization applications 237, such as dedicated applications (e.g., apps, applet, or the like), portions of dedicated applications, a web browser or other apps that allow for receipt of information and/or sending of information over the network 202. In some embodiments, the one or more memory components 236 include one or more data stores 239 for storing data related to the one or more organization systems 230, including, but not limited to, data created, accessed, and/or used by the one or more organization systems 230. The organization applications 237 may communicate with the applications of the one or more interactive panel systems 210, the one or more user computer systems 230, and/or one or more other computer systems 240 in order to communicate with other systems on the network 202 and take various actions described herein related to managing the use and operation of the interactive panel systems 210 (e.g., the information illustrated on the displays 20, 60 , or the like).

Furthermore, the other computer systems 240 (e.g., third party systems, or the like), which may be used to provide information to, receive information from, control mobile aspects of, or the like the interactive panel systems 210, may have components similar to the components described with respect to the one or more interactive panel systems 210, the one or more user computer systems 220, and/or the one or more organization systems 230 (e.g., one or more communication components, one or more processing components, one or more memory components with computer-readable instructions of one or more applications, one or more datastores, or the like). Thus, the one or more other computer systems 240 communicate with the one or more interactive panel systems 210, the one or more user computer systems 220, and/or one or more organization systems 230 in same or similar way as previously described with respect to the one or more interactive panel systems 210, the one or more user computer systems 220, and/or the one or more organization systems 230.

As will be appreciated by one of skill in the art in view of this disclosure, embodiments of the invention may be embodied as an apparatus, a system, computer program product, and/or other device, a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Figure 13:
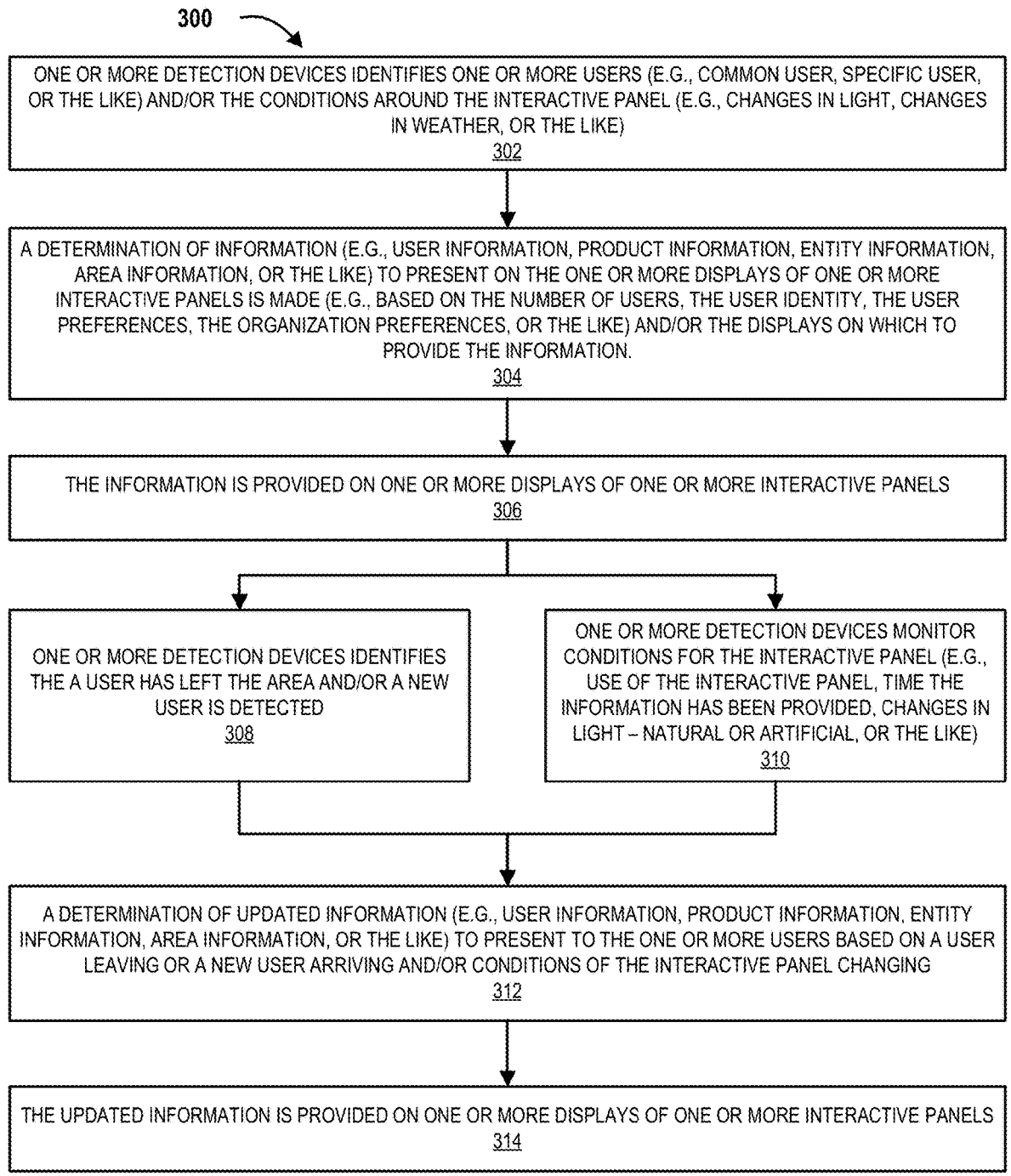
FIG. 13 illustrates a process flow for operation of the interactive panel, in accordance with some embodiments of the present disclosure.

FIG. 13 illustrates a process 300 for the operation of the interactive panel 1. As illustrated in block 302, the one or more detection devices 90 identify the presence of one or more users 204 (e.g., one or more general users, one or more specific users, or the like). Furthermore, the one or detection devices 90 may determine if conditions around the interactive panel 1 have changed (e.g., change to morning, change to evening, lights in building have been turned on or off, chance in the weather, or the like). The detection devices 90 detect the users 204 and/or the changes in the conditions in the ways previously discussed herein.

Block 304 of FIG. 13 further illustrates that a determination of information to present on one or more displays 20, 60 of one or more interactive panels 1 is made based on the detection of one or more users 204 and/or changes in conditions around the interactive panel 1. The determination of the information may include determining the user information, the product information, the entity information, area information, or the like to present and/or on what one or more displays 20, 60 of one or more interactive panels 1 to display the information, as previously discussed herein. FIG. 13 further illustrates in block 306 that the information is presented on the one or more displays 20, 60, as previously discussed herein.

Block 308 of FIG. 13 illustrates that the one or more detection devices 90 continue to monitor if any users 204 leave the area and/or any new user arrives in the area, as previously discussed herein. Moreover, block 310 illustrates that the one or more detection devices further monitor the conditions around the interactive panel 1, as previously discussed herein. For example, the users 204 interact with the display (e.g., touchscreen, illustrate information on the display, use the user computer system 220 to provide information on the displays 20, 60, or the like) and/or time, temperature, lighting, or the like changes occur adjacent to the interactive panel 1.

FIG. 13 further illustrates in block 312 that a determination of updated information (e.g., updated user information, updated product information, updated entity information, updated area information, or the like) is presented to the one or more users based on a user leaving or a new user arriving and/or a change in conditions of the interactive panel 1. Block 314 in FIG. 13 further illustrates that the updated information is provided on one or more displays 20, 60 of the one or more interactive panels 1, as previously discussed herein.

Figure 14:
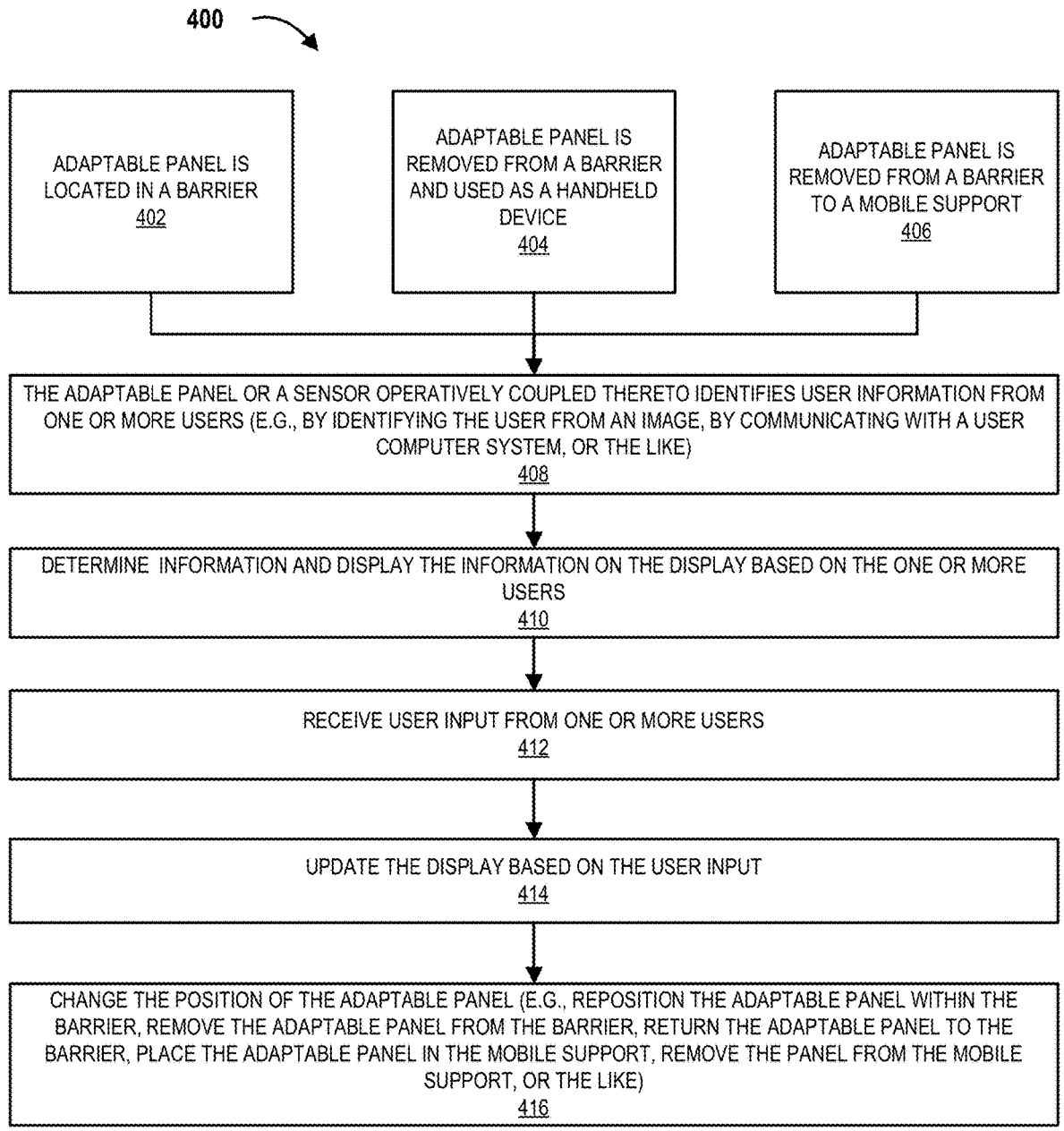
FIG. 14 illustrates a process flow for using the adaptable interactive panel, in accordance with some embodiments of the present disclosure.

FIG. 14 illustrates a process 400 for the operation of the adaptable interactive panel 1. As illustrated in block 402 of FIG. 14, the adaptable panel is located within a barrier 2. Alternatively, as illustrated in block 404, the adaptable panel 1 may be removed from a barrier 2 and used as a handheld device. In other embodiments, as illustrated in block 406, the adaptable panel 1 is located within a mobile interactive panel system 100 (e.g., the interactive panel 1 is removed from the barrier 2 and assembled to the mobile support 110 to be used as an adaptable interactive mobile system 100, or the entire system 100 is removed from the barrier 2.

As illustrated in block 408, the one or more detection devices 90 identify the presence of one or more users 204 (e.g., one or more general users, one or more specific users, or the like). In some embodiments, the user 204 may use a user device to present information on the adaptable panel 1.

Block 410 of FIG. 14 further illustrates that a determination of information to present on one or more displays 20 of the adaptable interactive panels 1 is made based on the detection of one or more users 204. The determination of the information may include determining the user information, the product information, the entity information, area information, or the like to present and/or on what one or more displays 20 of one or more interactive panels 1 to display the information. Block 410 further illustrates that the information is presented on the one or more displays 20, as previously discussed herein.

FIG. 14 further illustrates in Block 412 that the adaptable interactive panel 1 may receive user input from one or more users 412. The user input may be identifying one or more users that arrive in the area, one or more users that leave the area, one or more users that communicate with the adaptable interactive panel 1 to change the information on the display (e.g., using a touchscreen on the display, using the user computer system 220 to interact with the display, or the like).

Block 414 of FIG. 14 further illustrates that the display is updated based on the user input. For example, the information provided on the adaptable interactive panel 1 changes as the one or more users interact with the adaptable interactive panel 1.

FIG. 14 further illustrates in block 416 that the adaptable panel 1 is adjusted. For example, the adaptable panel 1 within a barrier 2 may be adjusted between adjacent rooms. Alternatively, or additionally, the adaptable panel 1 may be removed from the barrier 2 for hand-held use, or the like. In other embodiments, the adaptable panel 1 may be replaced into the barrier 2. In some embodiments, the adaptable panel 1 may be assembled to the mobile interactive panel system 100 and/or the mobile interactive panel system 100 itself may be removed from the barrier 2 and/or automatically moved to another location.

As generally discussed above, it should be understood that security features may be incorporated into the barrier 2, including the interactive panel 1. As such, a door 6 (e.g., the core, faces, and/or edges), the door frames 160 (e.g., as illustrated in FIGS. 11A and 11B), revolving door frames 130, the walls 8, floor, and ceiling of the adjacent rooms may include the security features. For example, the barrier 2 may provide electromagnetic shielding, sound resistance, forced entry and/or ballistic resistance, privacy features, light reduction, fire and/or smoke resistance, or the like.

In particular, the barrier 2 may be an electromagnetic compatibility (EMC) rated barrier 2 (e.g., provides electromagnetic interference (EMI), radio frequency interference (RFI), microwave, or the like shielding). The EMC shielding is used to restrict (e.g., reduce, eliminate, or the like) the passing of radio waves, electromagnetic fields, and electrostatic fields outside of the room. Typical shielding materials used for EMC shielding may include an EMC coating, such as a fluid (e.g., liquid, mist, gas, or the like) having a suitable EMC shielding material, typically copper, silver, nickel, aluminum, or the like, or combinations thereof, in the form of particles suspended in the fluid. The EMC coating is applied to a surface, and thereafter dries, to form the EMC shielding. In some embodiments, the barrier 2 may be made of a material that provides EMC shielding, such as steel (e.g., stainless steel, or the like), aluminum, or the like. Alternatively, the EMC shielding may be an EMC shielding barrier (e.g., fabric-wrapped foam, wire mesh, stamped metal, elastomer, adhesive, glue, resin, epoxy, tape, caulk, or the like) that may be applied to a surface or between surfaces. For example, the EMC shielding barrier may be a steel, aluminum, copper layer, copper screen, or the like in order to absorb the radio and magnetic waves.

EMC shielding may be used in many different applications, such as in healthcare rooms (e.g., MRI rooms, or the like), IT/data storage facility protection, government buildings (e.g., embassies, department of state, secret service, or the like), military applications, businesses, labs, emergency call centers, sensitive electronic installations, security facilities, financial centers, RFID scanning locations, or the like. As such, EMI shielding may be used to help avoid computer crashes, protect sensitive electronic equipment, protect storage of confidential information, avoid interference from RF transmitters (e.g., from radio towers, TV broadcast, airport radar, test equipment, or the like), and/or other like applications.

The EMC shielding may meet or exceed the IEEE 299-2006 and/or TEMPEST standards (e.g., as available at the time of filing, or thereafter updated). Frequencies at which electromagnetic radiation of energy occurs is at follows: at very low frequencies: −30 kHz, low: 30 to 300 kHz; medium frequencies: 300 to 3,000 kHz; high frequencies: 3 to 30 MHz, very high frequencies: 30 to 300 MHz, ultrahigh frequencies: 300 to 3,000 MHz, superhigh frequencies: 3 to 30 GHz, and extremely high frequencies: 30 to 300 GHz. Typical EMC shielding shields from approximately 70 dB to 140 dB (or the like) from 9 kHz to 18 GHz; however, it should be understood that EMC shielding may occur within these ranges, overlap these ranges, or fall outside of these ranges. The relative capability of a shield to screen out undesirable electric and magnetic fields and plane waves is the ratio of the signal received without the shield to the signal received inside the shield.

A room that is designed for EMC shielding typically has shielding in the walls 8, doors 6, ceiling, floor, frames 130, 160, or the like. Moreover, the EMC shielding may be utilized, such as by forming a component from EMC material, covering a component in one or more layers (e.g., sheets, or the like) of an EMC material, coating a component with a fluid (e.g., liquid, mist, gas, or the like) that has EMC material particles suspended therein, or the like. It should be understood, breaks in the shielding reduce the effectiveness of the EMC shielding. As such, in order to provide the EMC shielding in the present embodiments, the components of the barrier 2 incorporate the EMC shielding in one or more ways.

With respect to door frames 160, the EMC shielding may be a painted EMC shielding coating (e.g., cooper, silver, nickel, aluminum, or the like, particles, or combinations thereof in a fluid). In some embodiments, the door frames 160 may be made of a material that provides EMC shielding, such as steel (e.g., stainless steel, or the like), aluminum, or the like. Alternatively, or additionally, in order to maintain the effectiveness of the EMI shielding, a EMC shielding barrier (e.g., fabric-wrapped foam, wire mesh, stamped metal, elastomer, adhesive, glue, resin, epoxy, tape, caulk, or the like) may be applied to the door frame 160 and/or the wall 6. For example, the EMC shielding barrier, such as a caulk, may be used on the edges of the frame 160 adjacent the wall 2 to maintain the EMC circuit between the frame 160 and the wall 2.

Moreover, in order to maintain the EMC shielding between the frame 160 and the door 6, the door 6 may have shielding on the faces (e.g., front face and/or rear face) and/or formed as one or more layers within the door 6, as well as on the edges of the door 6 (e.g., the first edge, the second edge, the upper edge and the bottom edge). The EMC shielding may be provided as the material used to make the components, may be an EMC shielding coating (e.g., painted, layer, adhesive, or the like), and/or may be an EMC shielding layer.

In addition to the door 6 and frames 130, 160 having EMC shielding, the seals 170 of the door 6 and/or frames 130, 160 may have EMC shielding in order to maintain the EMC shielding circuit without having any or having minimal areas with brakes in the EMC shielding. For example, the seals 170 may be made of an EMC material, may be covered in an EMC coating (e.g., paint, or the like), and/or be operatively coupled to the door 6 and/or frames 130, 160 with an EMC barrier (e.g., caulk, or the like). As such, a door edge may contact the frame 130 and/or the seal 170 when the door 6 is closed in order to reduce breaks in the EMC shielding. Moreover, it should be understood that the interactive panel 1, including the protective layers 80 may have EMC shielding (e.g., coatings, barriers, or the like).

It should be understood that the embodiments of the present invention provides improved EMC shielding for a barrier 2 that includes an interactive panel 1. However, it should be understood that alternatively, or additionally, the EMC shielding security features of the barrier 2 may be replaced by, or may also provide, other security features. For example, the security features may include FEBR protection (e.g., forced entry, ballistic, blast, or the like protection), sound abatement, fire and/or smoke protection, air flow reduction, or the like, and/or combinations of any of the foregoing.

With respect to sound abatement, it should be understood that the barrier 2 and the features thereof may be made of a material for sound abatement. For example, the seals 170 may be made of silicone, or the like material, which provides sound and light from infiltrating a room. Moreover, the seals 170 may be high-temperature seals that are effective between −58 to 450 degrees F., or more. Furthermore, the interactive panel 1, such as the protective layer 80 may be made of a material (e.g., silicon, or the like) that provides sound abatement. As such, the barrier 2 (e.g., door 6, wall 8, frames 130, 160), including the interactive panel 1, and the seal 170 may meet ASTM E90 and BS EN ISO 140-3 for sound abatement.

With respect to fire and/or smoke protection, the barrier 2 and the features thereof may be made of a material for fire and/or smoke abatement. For example, the seals 170 may be made of a material, such as silicone, or the like, which may be effective up to and over 450 degrees to provide smoke and/or fire abatement. Furthermore, the interactive panel 1, such as the protective layer 80, may be made of a material (e.g., silicon, or the like) that provides fire and/or smoke abatement. Moreover, the door 6, wall 2, frames 130, 160 or the like may include intumescent compounds (e.g., as the seals or may include intumescent compounds separate from and located adjacent the seals) such that the barrier 2 provides 30, 35, 40, 45, 50, 55, 60, or the like minutes of fire abatement (e.g., meeting UL 10B fire tests and/or UL 10C positive pressure fire tests). Furthermore, the barrier 2 may meet UL 1784 and/or NFPA 105-2013 for smoke abatement, and allow no more than 3.0 cfm per square foot at 0.10" water column (about 75 Pa).

Furthermore, the barrier 2 may provide air flow abatement, and as such the barrier may meet ASTM E-283 and/or NFRC 400-2020 (e.g., as available at the time of filing, or thereafter updated) for low air leakage allowance, and/or allow no more than 0.3 cfm per square foot at 1.57 psf.

In some embodiments, in the event that the door 6 and/or door frame 130, 160 are FEBR rated, the door 6, door frames 130, 160, and/or interactive panel 1 may include one or more layers of conventional and/or non-conventional ballistic resistant materials. In one embodiment the non-conventional ballistic resistant materials may include (i) a first layer (e.g., a projectile resistant layer) formed from one or more fiber layers, and (ii) one or more additional layers of a sheet (e.g., a porous sheet) and/or one or more additional layers of a fill material. Typically, the first layer may comprise a single fiber layer or a plurality of fiber layers. Each of the one or more fiber layers may comprise, at least in part, woven or non-woven fibers (e.g., textile fabrics, plastics, or the like).

With respect to fiber layers that are fabric layers, the fabric layers may be manufactured by weaving, knitting or otherwise interlacing certain fibers. In some embodiments, the fabric layers comprise woven (or knitted or interlaced) mineral fibers, such as basalt fibers, in part or in its entirety. In other words, the fabric layer may be formed from a solid mineral, such as basalt. The fabric layer (e.g., the basalt fabric layer, or the like) may comprise a thickness in the range of about 0.005-0.1 inches. In some embodiments, the basalt fabric layer comprises a thickness of about 0.01, 0.015, 0.02, 0.025, 0.030 inches (+/−0.005) and a density of 0.03, 0.04, 0.05, 0.06, 0.07, 0.08, 0.09, 0.10 oz./sq. ft. (+/−0.005). However, it should be understood that the thickness of each of the one or more fabric layers may be any thickness, and/or have any density (e.g., range between, overlap, and/or fall outside of any of the forgoing values). While the fabric layers may be made, at least in part, from basalt, in other embodiments, at least a portion of the fabric layers may be made out of other minerals, metals, alloys, plastics, composites, organic materials, polymers, etc. It should be understood that the use of one or more fabric layers may aid is resisting physical impacts, as will be discussed in further detail herein.

With respect to plastic layers (e.g., non-woven UHMWPE, or the like), the plastic fibers may be formed into a sheet using a bonding material (e.g., resin, or other like bonding material). In some embodiments the plastic layers may comprise plastic fibers that are bonded with resin into a sheet. In other words, the plastic layer may be formed from a solid mineral (e.g., plastic fibers and resin), such as UHMWPE. The plastic layer (e.g., the UHMWPE layer, or the like) may comprise thicknesses that are the same as or similar to the thickness described with respect to the fabric layers discussed above. While the plastic layers may be made, at least in part, from UHMWPE, in other embodiments, at least a portion of the plastic layers may be made out of other types of plastics, or metals, alloys, composites, organic materials, polymers, or the like. It should be understood that the use of one or more plastic layers may aid is resisting physical impacts, as will be discussed in further detail herein. The plastic layer (e.g., UHMWPE, or the like) may be 10, 12, 15, 17, 20, or the like times stronger than steel and/or approximately twice as strong as other high strength polymers (e.g., Kevlar), but is also light enough to float (e.g., approximately 20, 30, 40, 50 or the like lighter than Kevlar).

It is noted that the one or more fiber layers may form the first layer (e.g., a projectile resistant layer). In the instances where multiple fiber layers form the first layer, the fiber layers may all be the same or similar in terms of materials, fiber composition, fiber thickness, weave pattern, non-weave pattern, grain orientation, and other characteristics, or the fiber layers may differ with respect to at least one characteristic. For example, the fiber layers may be orientated in the same direction or may be orientated in different directions. That is, for example, successive fiber layers may be rotated any degree with respect to each other (e.g., in particular, when the fiber layers are woven and may have a pattern). As such, should the fiber layers have a particular pattern, the fiber layers may be orientated such that the fiber pattern does not line up between at least two of the fiber layers. It should be further understood that when a plurality of fiber layers are used for the first layer, the plurality of fiber layers may be operatively coupled to each other in one or more various ways. For example, the fiber layers may be mechanically coupled together, such as through the use of fasteners (e.g., rivets, pins, needles, or the like) that may be inserted through the fiber layers (e.g., in some cases through the weaves of fabric layers, or the like). Additionally, or alternatively, the fiber layers may be operatively coupled together through the use of a compound (e.g., adhesive, glue, resin, epoxy, tape, caulk, or the like) that is applied to one or more opposing surfaces of the fiber layers. In other embodiments, the fiber layers may be operatively coupled together by sandwiching the fiber layers between other layers that are operatively coupled together, by placing the fiber layers within a shell, and/or by bounding the fiber layers with a string, ribbon, mesh, fabric, or other flexible material that may be wrapped around at least a portion of the fiber layers in order to create the first layer (e.g., the projectile resistant layer). It should be understood that the layers described herein may be added to and/or lined within door 6, wall 8, and/or frames 130, 160 before, during, and/or after manufacturing, packaging, installation, or the like using the same or similar couplings as described with respect to operatively coupling the layers to each other. As such, the layers, including the fill material, may be pre-assembled to the door 6, wall 8, and/or frames 130, 160 during installation.

It should be understood that the door 6, wall 8, and/or frames 130, 160 may further comprise additional layers, each of which may comprise one or more fiber layers. For example, the door 6, wall 8, and/or frames 130, 160 may have a second layer, third layer, fourth layer, or the like, each of which are formed from one or more fiber layers. In the instances where the door 6, wall 8, and/or door frames 130, 160 comprise multiple projectile resistant layers of one or more fiber layers, each of the projectile resistant layers may be the same or different with respect to the number of the fiber layers therein, arrangement/ordering of the fiber layers therein, characteristics of the fiber layers therein, and/or the like.

Referring to the additional layers of the door 6, wall 8, and/or door frames 130, 160 the one or more additional layers may comprise a sheet (e.g., a porous sheet), which may typically comprise a material having a plurality of apertures in the form of voids, cavities, hollow interior chambers, surface hollows, slots, and/or through holes. These plurality of apertures may extend over a portion of a thickness, length, and/or width of the sheet, and/or they may extend over the entirety of the thickness, length, and/or width of the sheet. Additionally, the plurality of apertures may extend only partially into the sheet (e.g., embossed into the sheet), or the plurality of apertures may be through-holes. Moreover, in some embodiments, the sheet may be a porous sheet, such as, a foam sheet. The foam sheet may be made from a metal, such as aluminum or its alloys. The aluminum foam sheet is porous with a plurality of apertures that create a sponge-like structure and is ultra-light weight, resulting in aluminum foam sheet being able to float in water. The aluminum foam sheet is non-flammable and does not emit any toxic gases. Moreover, the porosity of the aluminum foam sheet (e.g., the air-filled voids in particular), provide acoustic absorption and electromagnetic shielding. The aluminum foam sheet may be manufactured from recycled materials.

The foam sheet may comprise a thickness in the range of about 0.05 to 1.875 inches (or in some embodiments up to 3 inches or more for thicker doors and/or door frames 20). In some embodiments, the foam sheet comprises a thickness of about 0.1, 0.15, 0.20, 0.25, 0.3, 0.35, 0.40, 0.45 to 0.70, 0.75, 0.80, 0.85, 0.9, 0.95, 1, 1.1, 1.2, 1.3, 1.4, 1.5, 1.6, 1.7, 1.8, 1.875, or more inches and a density of about 0.63 lbs./sq. ft (0.55, 0.57, 0.59, 0.61, 0.65, 0.67, 0.69, 0.71, or the like). However, it should be understood that the foam sheet may have any thickness and/or any density (e.g., having a range that falls between, overlaps, and/or falls outside of any of the forgoing values). While the foam sheet may be made of aluminum, in some embodiments, the foam sheet is made from other metals, steel, alloys, minerals, plastics, composites, organic materials, polymers, or the like. In some embodiments, the sheet is a grating framework made from suitable metals (e.g., aluminum), steel, alloys, minerals, plastics, composites, organic materials, polymers, or the like.

With respect to the one or more additional layers of a fill material, the fill material may comprise an undifferentiated whole structure, a collection of discrete structures, and/or combinations thereof. In the embodiments where the fill material comprises an undifferentiated whole structure, the fill material may be in the form of a solid or foamed sheet. In this regard, the fill material may be a polystyrene sheet having a thickness in the range of about 0.1, 0.15, 0.20, 0.25, 0.3, 0.35, 0.40, 0.45 to 0.70, 0.75, 0.80, 0.85, 0.9, 0.95, 1, 1.1, 1.2, 1.3, 1.4, 1.5, 1.6, 1.7, 1.8, 1.875, or more. However, it should be understood that the fill material may have any thickness (e.g., range between, overlap, and/or fall outside of any of the forgoing values). In the embodiments where the fill material comprises a collection of discrete structures, the fill material may be in the form of pellets, spheroids, grains, or the like. It should be understood that the fill material may be a solid material, or it may be a liquid material that later becomes solid. In some embodiments, the fill material may provide insulation for the door 6, wall 8, and/or door frames 130, 160. The barrier system (e.g., the door, wall, or the like) may meet or exceed thermal and performance standards per ASTM E283 and/or NFRC 400-2020 (e.g., as available at the time of filing, or thereafter updated).

In some embodiments, the fill material may be a homogenous cementitious material (e.g., concrete, or the like), a composite cementitious material (e.g., including a mixture of cementitious material and/or other materials, such as fibers, foam, or the like). It should be understood that cementitious means any type of cement or other like material, such as traditional cement, fly ash, blast-furnace slag, limestone fines, aggregate, and/or other types of cementitious materials, alone or in combination with each other. The fill material, such as the composite cementitious material, may be much lighter than traditional homogenous cementitious material. For example, the fill material may be 10, 20, 30, 40, 50, 60, 70, or the like percent lighter than traditional cementitious material, or range between, overlap, and/or fall outside of any of these values. It should be understood that the cementitious material may be inserted into (e.g., poured, or the like) into the cavity in the form of a liquid fill material (e.g., completely liquid, liquid having particulates, and/or the like) which then hardens into a solid core.

The arrangement of the layers in the door 6, wall 8, and/or door frame 130, 160 will now be described in accordance with some embodiments of the invention. In some embodiments, one or more additional layers of a sheet and/or one or more additional layers of a fill material may be positioned in between a first layer, a second layer, and a third layer, each of which has one or more fiber layers. In other embodiments, a pair of layers (e.g., a first layer and a second layer) may be positioned adjacent each other. In yet other embodiments, a sheet (e.g., porous sheet) and a layer of a fill material may be placed next to each other. That said, the one or more layers, each comprising one or more fiber layers, and the one or more additional layers comprising one or more sheets and/or one or more filler layers may be arranged in any suitable order and in any suitable combination, based on the desired application. In some embodiments, the one or more additional layers of a sheet may be operatively coupled to the one or more fiber layers. In some embodiments, the one or more one or more filler layers may be operatively coupled to the one or more fiber layers. It should be understood that the one or more fiber layers, the one or more porous sheets, and/or the one or more filler layers may be operatively coupled to each other as was previously described with respect to operatively coupling the multiple fiber layers together (e.g., fasteners, adhesive, bounding, or the like).

The door 6, wall 8, and/or door frames 130, 160, including the interactive panel 1 of any of the foregoing may provide outstanding resistance to and protection from a variety of physical impacts by projectiles. In particular, even though the fiber layers are extremely thin (e.g., about 0.02 inches thick), the fiber layers (e.g., 30 fiber layers, 16 fiber layers, 14 fiber layers, 8 fiber layers, 6 fiber layers, 4 fiber layers, 2 fiber layers, or a single fiber layer, arranged in a stacked formations) are structured to provide various UL level protection from ballistic projectiles (e.g., firearm, or the like) and also protection from other projectiles such as debris or shrapnel. As such, the one or more projectile resistant layers, each comprising the one or more fiber layers (e.g., fabric layer, plastic layers, or the like as discussed herein), may alone or in combination with other layers, provide the desired FE (forced entry) and/or BR (Bullet/Ballistic Resistant) properties while providing reduced weights and/or improved shipping and/or installation processes. Moreover, the protective layer 80 of the interactive panel 1 may have the same protection.

Consequently, the barrier 2 (e.g., including the protective layer 80 of the interactive panel 1) may have UL752 Level 1 (9 mm handgun) to UL 752 Level 10 (.50 Caliber Rifle) protection, and in particular embodiments UL752 level 1 (9 mm), UL752 level 2 (.357 Magnum), UL752 level 3 (.44 Magnum), UL752 level 4 (.30 Caliber Rifle), UL752 level 5 (7.63 Caliber Rifle) UL752 level 6 (9 mm Rifle), UL752 level 7 (5.56 mm), UL752 level 8 (7.62 mm), UL752 level 9 (0.30-06 rifle), UL752 level 10 (0.50 caliber rifle), or the like protection, or have protection that ranges between, overlaps, or falls outside of these levels of protection (e.g., as specified as of the filing date of this application). Furthermore, the door 6, and/or door frames 130, 160 may also be rated to withstand 5, 10, 15, 20, 25, 30, 40, 50, 60, or the like minutes of simulated "mob" attack, or range between, overlap, or outside of these levels of protection.

In some embodiments of the invention, the fiber layers may be fabric layers of basalt woven fabric, other similar material. In some embodiments of the invention, the fiber layers may be plastic layers of UHMWPE. In some embodiments of the invention, the one or more projectile resistant layers may comprise other types of materials, such as, but not limited to Kevlar or other Bullet resistant fabrics (e.g., woven fabric, non-woven fabric, knitted fabric, other fabrics, or the like) or bullet resistant plastic that provide the same or similar protection as described with respect to the fiber layers. The protective or filler layers and materials can be added separately, or may be bonded together using structural adhesives, resins, heat, mechanical or other similar means. Furthermore, the costs of the various layers of the composite barrier 2 would be about half the cost of conventional materials without adding bulk to the barrier 2 (e.g., doors 6, wall 8, and/or door frames 130, 160 in which they are used).

Moreover, the sheet layers, such as a porous sheet (e.g., the aluminum foam, or the like), used in the barrier 2 are structured to exhibit electrical resistance (e.g., because it does not conduct electricity), provide EMC shielding as previously discussed herein, provide fire protection (e.g., because it is non-inflammable), and provide various other properties that conventional materials are not able to provide. In other embodiments, the sheet layers may comprise a polycarbonate, SGG material, or other type of foam sheet.

Furthermore, fill material is described generally herein as providing additional material in order to fill out the thickness of the barrier 2 (if needed) and in some embodiments provide an insulated core to at least a portion of the barrier 2. While the fill material is generally described as being a polystyrene sheet or other type of structure (e.g., loose material, or the like), it should be understood that the fill material may be any type of material (e.g., lightweight, or the like), such as, but not limited to a polyisocyanurate, polyurethane, fiberglass, cellulose, mineral wool, kraft paper (e.g., structural, or the like), plastics, polycarbonates, vermiculite, perlite, cementitious foam (e.g., magnesium oxide, such as magnesium silicate), phenolic foam, or other like material. Regardless of the fill material, it may provide structural, protective, sound transmission prevention, thermal protection, fire resistance or fire proofing, or the like properties. In some embodiments the fill material may also have projectile resistance (e.g., firearm, blast, weather related resistance—wind, projectile, or the like, mob attack) and/or may have other properties that provide chemical resistance, radio frequency resistance, electromagnetic resistance, or the like.

Several alternative examples have been described and illustrated herein. A person of ordinary skill in the art would appreciate the features of the individual embodiments and the possible combinations and variations of the components. A person of ordinary skill in the art would further appreciate that any of the examples could be provided in combination with the other examples disclosed herein.

As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

It will be understood that when an element is referred to as being "operatively coupled" (other similar phrase) to another element, the elements can be formed integrally with each other, or may be formed separately and put together. Furthermore, "operatively coupled" to can mean the element is directly engaged or operatively coupled to the other element, or intervening elements may be present between the elements. Furthermore, "operatively coupled" may mean that the elements are detachable from each other, or that they are permanently coupled together.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as top, bottom, front, rear, side, upper, lower, left, right, horizontal, vertical, upward, downward, first, second, third, inside, outside, or other similar terms used herein are intended for illustrative purposes only and do not limit the embodiments in any way. The referenced components may be oriented in an orientation other than that shown in the drawings and the terminology, therefore, should be understood as encompassing such variations unless specified otherwise. All structural and functional equivalents to the elements of the various aspects described throughout the disclosure that are known or later come to be known to those of ordinary skill in the art are expressly incorporated herein by reference and are intended to be encompassed by the claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subj ect technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or combined into multiple software/hardware products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, the subject matter lies in less than all features of a single disclosed configuration or operation. The claims are hereby incorporated into the detailed description, with each claim standing on its own as a separately claimed subject matter.

What is claimed is:

1. An interactive panel for use within a barrier system, the interactive panel comprising:
    one or more panel displays;
    an interactive panel system operatively coupled to the one or more panel displays, wherein the interactive panel system comprises:
        one or more memory devices with computer-readable program code stored thereon; and
        one or more processing devices operatively coupled to the one or more memory devices, wherein when executed the computer-readable program code is configured to cause the one or more processing devices to:
            identify a presence of one or more users or a condition change adjacent the one or more panel displays through one or more detection devices; and
            provide information on the one or more panel displays to the one or more users in response to identifying the presence of the one or more users or the condition change;
    wherein the barrier system comprises a barrier that is a door for accessing an area and a frame that is a door frame that is operatively coupled with a wall and the barrier to allow the barrier to move with respect to the frame; and
    wherein the one or more panel displays are configured to be located and viewed within the door frame.

2. The interactive panel of claim 1, wherein the one or more detection devices comprise one or more sensors operatively coupled to the interactive panel system.

3. The interactive panel of claim 1, wherein the one or more detection devices comprise one or more communication devices that communicates with one or more user devices of the one or more users.

4. The interactive panel of claim 1, wherein the one or more detection devices capture a user identifier from one or more user devices and accesses the information from stored information for the one or more users using the user identifier.

5. The interactive panel of claim 1, wherein the interactive panel is configured to be operatively coupled with a power source at least partially located within the frame.

6. The interactive panel of claim 5, wherein the power source comprises a wired connection or a battery located within the frame.

7. The interactive panel of claim 1, further comprising:
    an energy harvesting layer operatively coupled to the interactive panel system to provide power to the one or more panel displays or the interactive panel system directly or indirectly through one or more batteries.

8. The interactive panel of claim 7, wherein the energy harvesting layer is operatively coupled over at least a portion of the one or more panel displays.

9. The interactive panel of claim 1, wherein the one or more panel displays comprise:
    an outer panel display; and
    an inner panel display;
    wherein the outer panel display provides the information to outside users and the inner panel display provides the information to inside users.

10. The interactive panel of claim 9, wherein the one or more detection devices comprise:
    one or more outer detection devices; and
    one or more inner detection devices;
    wherein the one or more outer detection devices are used to identify the presence of one or more outer users or an outer condition change adjacent the outer panel display;
    wherein the one or more inner detection devices are used to identify the presence of one or more inner users or an inner condition change adjacent the inner panel display; and
    wherein the information is provided on the outer panel display or the inner panel display.

11. The interactive panel of claim 1, wherein the information comprises user information, product information, entity information, or area information.

12. The interactive panel of claim 11, wherein the information is user information that comprises a user profile, a username, a user title, a user image, or a user bio.

13. The interactive panel of claim 11, wherein the information is product information that comprises information about a good or a service or product marking material.

14. The interactive panel of claim 11, wherein the information is entity information that comprises information about entities that provide products or entity locations.

15. The interactive panel of claim 11, wherein the information is area information that comprises information about directions, weather conditions, or occupancy information.

16. The interactive panel of claim 1, wherein the one or more panel displays comprise an electroluminescent display, an organic light emitting diode display, a LED display, a LCD display, a plasma display, a QLED display, a DLP display, or an electronic ink display.

17. The interactive panel of claim 1, wherein the one or more panel displays further comprise at least a second display in the door of the barrier or in the wall of the barrier.

18. The interactive panel of claim 1, wherein the one or more interactive panels are removeable from the frame.

19. An interactive barrier system, the barrier system comprising:
  a barrier for accessing an area, wherein the barrier is a door;
  a frame operatively coupled with a wall and the barrier to allow the barrier to move with respect to the frame, wherein the frame is a door frame; and
  one or more interactive panels, wherein the one or more interactive panels comprise:
    one or more panel displays, wherein the one or more panel displays are located and viewed within the door frame;
    an interactive panel system operatively coupled to the one or more panel displays, wherein the interactive panel system comprises:
      one or more memory devices with computer-readable program code stored thereon; and
      one or more processing devices operatively coupled to the one or more memory devices, wherein when executed the computer-readable program code is configured to cause the one or more processing devices to:
        identify a presence of one or more users or a condition change adjacent the one or more panel displays through one or more detection devices; and
        provide information on the one or more panel displays to the one or more users in response to identifying the presence of the one or more users or the condition change.

20. A method for utilizing an interactive panel in a barrier system having a barrier that is a door for accessing an area and a frame that is a door frame operatively coupled with a wall and the barrier to allow the barrier to move with respect to the frame, wherein the interactive panel comprises one or more panel displays that are located and viewed within the door frame, and an interactive panel system operatively coupled to the one or more panel displays, wherein the interactive panel system comprises one or more memory devices with computer-readable program code stored thereon, and one or more processing devices operatively coupled to the one or more memory devices, and wherein the method comprises:
  identifying, by the one or more processing devices, a presence of one or more users or a condition change adjacent the one or more panel displays through one or more detection devices; and
  providing, by the one or more processing devices, information on the one or more panel displays to the one or more users in response to identifying the presence of the one or more users or the condition change.

* * * * *